United States Patent [19]

Muramatsu et al.

[11] Patent Number: 5,745,253
[45] Date of Patent: Apr. 28, 1998

[54] IMAGE READING APPARATUS AND METHOD FOR READING IMAGES OF DIFFERENT SIZES OF ORIGINALS

[75] Inventors: Hideo Muramatsu, Shinshiro; Munehiro Nakatani, Toyonashi; Akio Nakajima, Toyokawa, all of Japan

[73] Assignee: Minolta Camera Kabushiki Kaisha, Osaka, Japan

[21] Appl. No.: 394,944

[22] Filed: Feb. 24, 1995

Related U.S. Application Data

[62] Division of Ser. No. 979,077, Nov. 19, 1992.

[30] Foreign Application Priority Data

| Dec. 27, 1991 | [JP] | Japan | 3-345947 |
| Apr. 24, 1992 | [JP] | Japan | 4-106226 |

[51] Int. Cl.$^6$ .................................................. H04N 1/00
[52] U.S. Cl. .......................... 358/408; 358/474; 358/496; 358/497; 355/23
[58] Field of Search ............................... 358/408, 474, 358/496, 497; 355/320, 23, 233

[56] References Cited

U.S. PATENT DOCUMENTS

| 4,571,636 | 2/1986 | Itoh | 358/285 |
| 4,839,740 | 6/1989 | Yoshida | 358/288 |
| 4,908,719 | 3/1990 | Nonoyama | 358/408 |
| 4,910,612 | 3/1990 | Yamazaki | 358/496 |
| 4,949,189 | 8/1990 | Ohmori | 355/23 |
| 5,001,566 | 3/1991 | Coli et al. | 358/474 |
| 5,055,880 | 10/1991 | Fujiwara | 355/233 |
| 5,136,665 | 8/1992 | Inoue | 358/408 |
| 5,198,853 | 3/1993 | Ichihara et al. | 358/488 |
| 5,298,937 | 3/1994 | Telle | 350/474 |
| 5,444,554 | 8/1995 | Muramatsu et al. | 358/494 |

FOREIGN PATENT DOCUMENTS

| 0111481 | 7/1983 | Japan | 358/408 |
| 2-63262 | 3/1990 | Japan . | |
| 3-3564 | 1/1991 | Japan . | |
| 3-265355 | 11/1991 | Japan . | |

Primary Examiner—Edward L. Coles, Sr.
Assistant Examiner—Thomas L. Stoll
Attorney, Agent, or Firm—Burns, Doane, Swecker & Mathis, LLP

[57] ABSTRACT

The invention relates to an image reading apparatus for reading images of original documents by moving the original relative to a stationary image reader. A single image reader is used in a first embodiment. When reading the image of a first side, the single image reader is stationary at a first position to read the original. When reading the image of a second side, the single image reader is moved to a second position corresponding to the size of the original, and reads the image of the second side while said image reader is stationary at the second position. The image reading apparatus of the second embodiment uses a stationary first reader for reading a first side of an original, and a movable second image reader for reading a second side of an original. The image reading apparatus of the second embodiment changes the position of the image reader in accordance with the size of the original.

8 Claims, 35 Drawing Sheets

Lm = 432

Lb = 432 - (Ld - Lp)/2

Ld = original length

Lp = return path length

| | Operation mode | | | |
|---|---|---|---|---|
| | Memory Mode | | Direct | Direct & Memory |
| | Write | Read | | |
| Control Signal SG1 | A | N | N | A |
| SG2 | N | N | A | A |
| SG3 | N | A | N | N |
| SG4 | A | X | A | A |
| SG5 | X | A | A | A |

A: Active   N: Non-Active
X: Active or Non-Active

IMAGE READING APPARATUS AND METHOD FOR READING IMAGES OF DIFFERENT SIZES OF ORIGINALS

This application is a divisional of application Ser. No. 07/979,077, filed Nov. 19, 1992.

BACKGROUND OF THE INVENTION

1. Field of the Invention

The present invention relates to an image reading apparatus and method for reading images of original documents of different sizes.

2. Description of the Related Art

Image reading apparatus have come to be used as the input portion for digital-type copying apparatus, facsimiles and the like. In general, such image reading apparatus have image sensors comprising photoelectric converting elements, and produce electrical signals in accordance with an image on an original document.

In recent years, there has been a demand for image reading apparatus capable of automatically reading both sides of an original document. Image reading apparatus capable of automatically reading a duplex original can be broadly divided into two types.

A first type of image reading apparatus is provided with a pair of sensors, wherein one sensor reads the front side of the original and the other sensor reads the back side of the original. The aforesaid sensors are provided in opposed pairs and read the images on both sides of an original by a single pass of the duplex original between said sensor pair.

In conventional image reading apparatus, electrical signals output from the sensors are converted to image signals through various processes, e.g., binary processing, halftone processing and the like. The circuits necessary to accomplish the aforesaid processes are generally called signal processing circuits, and have complex circuit constructions. The image signals output from the signal processing circuits are printed by means of a printer, or transmitted by means of a facsimile apparatus.

Japanese Patent Application No. 3-3564 discloses a facsimile apparatus provided with an image reading apparatus of the first type described above. This image reading apparatus has a signal processing circuit respectively provided for each of the two image sensors. As previously mentioned, these signal processing circuits are expensive and, therefore, increase the cost of the facsimile apparatus.

Furthermore, the aforesaid image reading apparatus simultaneously generated image signals for the front side of the original and image signals for the back side of the original. However, since the facsimile apparatus cannot transmit both sets of image signals simultaneously, the apparatus is provided with a memory for temporarily storing the image signals for the back side of the original. That is, the image signals for the front side of the original are simultaneously generated and transmitted, whereas the image signals for the back side of the original are simultaneously generated and stored in memory, and after the image signals for the front side have been completely transmitted, the image signals for the back side which are stored in memory are transmitted. The aforesaid memory is also expensive and, therefore, increases the cost of the facsimile apparatus.

Japanese Patent Application No. 3-265355 discloses an image reading apparatus of the aforesaid first type, and is provided with a pair of image sensors which read the images on both sides of a duplex original by passing said duplex original twice between said pair of sensors. More specifically, one sensor generates electrical signals during the first pass of the original, and the other sensor generates electrical signals during the second pass of the original. Accordingly, the aforesaid apparatus does not simultaneously generate the electrical signals of the front side and the electrical signals of back side of the original, such that the processing of said signals can be accomplished by a single signal processing means. However, the aforesaid apparatus is provided with image reading means specific to the front side and specific to the back side of the original which requires two passes of the original document, thereby slowing the image reading speed.

A second type of image reading apparatus requires that an original document be fed twice to be read by a single sensor. The image of the front side of the original is read on the first pass of the original, whereupon the original is inverted and the original is fed again, and thereafter the image of the back side of the original is read on the second pass of the original.

Japanese Patent Application No. 2-63262 discloses an image reading apparatus of the aforesaid second type. This image reading apparatus is provided with a stationary sensor, an original feeding portion on one side of said sensor, and an original inverting portion on the other side of said sensor. The sensor reads the front surface of the original as said original is transported in a first direction (from the original feed portion toward the inverting portion). After this reading the original is discharged to the original inverting portion and inverted front-to-back, then the inverted original is transported in a second direction (from the original inverting portion toward the original feeding portion). The sensor reads the second surface of the original being transported in said second direction.

The aforesaid type of image reading apparatus can be produced less expensively because only one sensor is used. However, the aforesaid image reading apparatus has an original inverting path of fixed length causing the positional relationship between the sensor and the inverting path to be fixed, such that in the case of an original of a large size and in the case of an original of a small size, the original inverting path to be transited must remain constant, thereby adversely affecting efficiency.

SUMMARY OF THE INVENTION

A main object of the present invention is to provide an image reading apparatus and method that eliminate the various disadvantages inherent to the previously described conventional techniques.

Another object of the present invention is to provide an image reading apparatus and method thereof capable of efficient image reading operation in accordance with the size of the original document.

A further object of the present invention is to provide an image reading apparatus and method thereof capable of efficiently reading duplex originals.

A still further object of the present invention is to provide an image reading apparatus having a simple construction.

These objects are accomplished by providing an image reading apparatus and method of the present invention which change image reading position of the original document in accordance with the size of said original.

The image reading apparatus and method of the present invention further change the image reading position of the original document relative to the front side and the back side of said original.

These and other objects, characteristics and advantages of the present invention will become apparent from the following description of the preferred embodiments.

BRIEF DESCRIPTION OF THE DRAWINGS

FIGS. 1 through 11 show a first embodiment of the invention;

FIG. 1 is a front sectional view showing the general construction of a copying apparatus provided with an image reading apparatus;

FIG. 2 is a front elevation view showing the operation panel;

FIG. 3 is an illustration showing the positioning control of the scanner;

FIG. 5 is a block diagram showing the construction of the control portion of the copying apparatus;

FIGS. 6a and 6b are block diagrams showing the memory unit;

FIG. 8 is a flow chart showing the main routine of the CPU 106;

FIG. 9 is a flow chart showing the main routine of the CPU 107;

FIG. 10 is a flow chart showing the slider positioning process;

FIGS. 12 through 33 show a second embodiment of the invention;

FIG. 12 is a front section view showing the general construction of a copying apparatus provided with an image reading apparatus;

FIG. 13 is a front elevation view of the operation panel;

FIG. 14 is a timing chart showing the image signal flow in the high speed mode;

FIG. 15 is a block diagram of the image signal process section;

FIG. 16 is an illustration showing the scanner positioning control;

FIG. 17 is a block diagram showing the memory unit;

FIG. 18 is an illustration showing operation sequence of the memory mode writing operation;

FIG. 19 is a flow chart showing the main routine of the CPU 101;

FIG. 20 is a flow chart showing the main routine of the CPU 102;

FIG. 22 is a flow chart showing the main routine of the CPU 106;

FIG. 23 is a flow chart showing the main routine of the CPU 107;

FIG. 24 is a flow chart showing the input control process;

FIG. 25 is a flow chart showing the data input switching process;

FIG. 26 is a flow chart showing the command reception process;

FIG. 27 is a flow chart showing the scan control process;

FIG. 28 is a flow chart showing the command reception process;

FIG. 29 is a flow chart showing the status transmission process;

FIG. 30 is a flow chart showing the compression control process;

FIG. 31 is a flow chart showing the memory mode process;

FIG. 33 is a flow chart showing the original transport process.

DESCRIPTION OF THE PREFERRED EMBODIMENTS

First Embodiment (FIGS. 1 through 11)

Figure 1:
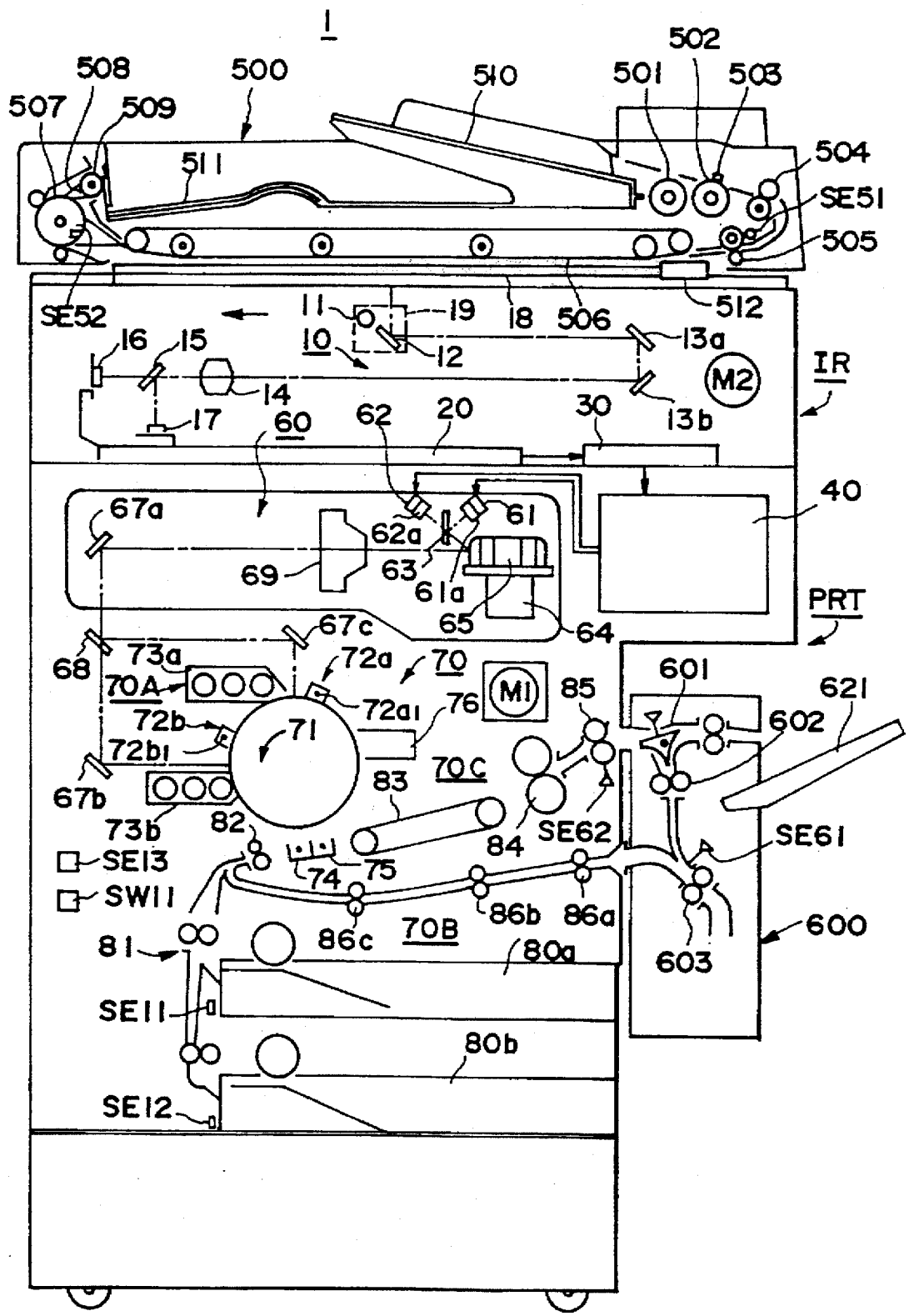

FIG. 1 shows the general construction of a copying apparatus 1.

The copying apparatus 1 comprises a document feeding portion 500 for feeding original documents onto the document platen 18, scanning unit 10 for reading the original disposed on the document platen 18 and converting the read data into image signals, image signal processing section 20 for processing the image signals transmitted from the scanning unit 10, memory unit section 30 for switchably outputting the image data input from the image signal section 20 directly to the printing device PRT or storing said image data in memory, print process section 40 for driving the two semiconductor lasers 61 and 62 in accordance with the image data input from the memory unit section 30, optical unit 60 for guiding the two beams emitted from the semiconductor lasers 61 and 62 to mutually different exposure positions on the surface of the photosensitive drum 71, image forming unit 70 for developing the latent image formed by the aforesaid exposure, transferring the developed image onto paper, and fixing said image on said paper to accomplish image formation, operation panel OP provided on the top of the copying apparatus main unit, document feeding portion 500 for transporting originals and inverting front-to-back said originals as required, and refeeding portion 600 for refeeding the paper again to the transfer position.

The image reading apparatus IR comprises the document feeding portion 500, scanning unit 10 and image signal portion 20, and the printing apparatus PR comprises the print processing portion 40, optical unit 60, and image forming unit 70.

The aforesaid scanning unit 10 comprises an exposure lamp 11, first mirror 12, second and third mirrors 13a and 13b, collimating lens 14, dichroic mirror 15, photoelectric converting elements 16 and 17 which use a charge-coupled device (CCD) array or the like, and a scanning motor M2.

The exposure lamp 11 and the first mirror 12 are mounted on the scanner 19 which is movable beneath the platen glass 18. The second and third mirrors 13a and 13b are also mounted on a separate scanner which is movable beneath the platen glass 18.

The image signal processing portion 20 processes the image signals output from the two photoelectric converter elements 16 and 17, discriminates each image element of the original document image as being a specified color (second color) or another color (first color), and outputs the color data attached to the image data to the memory unit section 30.

The print processing section 40 differentiates the transmitted image data with the attached color data so as to send said data in accordance with said differentiation to the two semiconductor lasers 61 and 62, and delays the image data output to the semiconductor laser 62.

The optical unit 60 comprises the semiconductor lasers 61 and 62, dichroic mirror 63 for combining the two laser beams, polygonal mirror 65 for deflecting the composite laser beam, main lens 69, reflecting mirror 67a, dichroic mirror 68 for separating the composite beam into the two original beams, reflecting mirrors 67b and 67c and the like.

The image forming unit 70 comprises a developing/ transfer unit 70A, transport unit 70B, and fixing unit 70C.

The developing/transfer unit 70A comprises a photosensitive drum 71 which is rotatably driven in the counterclockwise direction in FIG. 1, and arranged sequentially in the clockwise direction around the periphery of said photosensitive drum 71 from the upstream side are a first charger 72a, first developing device 73a, second charger 72b, second developing device 73b, transfer charger 74, separation charger 75, and cleaning portion 76.

The aforesaid first developing device 73a accommodates a two-component developing material comprising a carrier and a red color toner corresponding to the aforesaid second color. The second developing device 73b accommodates a two-component developing material comprising a carrier and a black color toner corresponding to the aforesaid first color.

The transporting portion 70B comprises paper cassettes 80a and 80b, size detecting sensors SE11 and SE12 for detecting the size of the copy paper, paper guide 81, timing roller 82, transport belt 83, and horizontal transport rollers 86a, 86b and 86c for transporting the copy paper from the refeeding portion 600.

The fixing unit 70C comprises a pair of fixing rollers 84 for heat/pressure fixing of the image on the transported copy paper, discharge roller 85, and discharge sensor SE62 for detecting the discharge of the copy paper.

The refeeding portion 600 temporarily stores the copy paper discharged from the discharge roller 85, inverts the copy paper front-to-back when the duplex mode has been selected, or does not invert the copy paper front-to-back when the composite mode has been selected, and feeds the copy paper to the horizontal roller 86a of the transport unit 70B for another image forming operation (printing). The refeeding portion 600 comprises a switching member 601 for switching between a discharge position to discharge the copy paper to a discharge tray 621 and a refeed position to refeed the copy paper, transport roller 602, inverting roller 603, and inverting sensor SE61.

In the duplex mode, the left end of the switching member 601 is moved upwardly by means of a solenoid not shown in the drawings, so as to guide the copy paper discharged from the discharge roller 85 toward the transport roller 602. The copy paper then passes the transport roller 602 and arrives at the inverting roller 603.

When the trailing end of the copy paper arrives at the inverting sensor SE61, said copy paper is inverted by the inverting roller 603 and transported toward the horizontal transport roller 86a. The inverted copy paper passes the horizontal rollers 86a, 86b and 86c, and stops when it arrives at the timing roller 82. At this time, the next copy papers are pretransported at sequentially predetermined intervals. The number of sheets of single-sided copy paper that can stop at the timing roller is dependent upon the length of the copy paper when there is no delay of the image data.

The document feeding portion 500 automatically feeds the originals set on the document feed tray 510 onto the platen glass 18, and discharges said originals from the platen glass 18 to the discharge tray 511 after the image has been read by the scanner 19.

The document feeding portion 500 comprises a feed roller 501, pad 503, intermediate roller 504, register roller 505, transport belt 506, inverting roller 507, switching member 508, discharge roller 509, paper tray 510, discharge tray 511, document scale 512, register sensor (feed sensor) SE51, and discharge sensor SE52.

The operation of the document feeding portion 500 varies in accordance with the original reading mode. The original reading modes include scanning modes for reading an original via a scanning operation of the scanner 19, and continuous flow modes for reading originals as they are being transported with the scanner 19 in a stationary state.

Accordingly, the operation of the document feeding portion 500 includes a scan one-side mode (i.e., one-side mode), continuous one-side mode, and continuous duplex mode, wherein only one side of the originals are read or both sides of the originals are read.

In the one-side mode, a single original or a plurality of originals are set on the tray 510 with the surface of the original to be read facing upward. When the operation starts, originals are fed sequentially from the lowermost portion of the stacked originals via the feed roller 501, and are transported via the roller 502 and pad 503 past the intermediate roller 504, and the inclination of the original is corrected by the register roller 505. The original is fed onto the platen glass 18 via the transport belt 506, and immediately after the trailing end of the original passes the left edge of the document scale 512, the transport belt is slightly reverse rotated, then stopped.

Thus, the right edge of the original (trailing end) abuts the edge of the document scale 512, and the original is properly positioned on the platen glass 18. At this time, the leading end of the next original has arrived at the register roller 505 so as to reduce the time required to feed the next original.

In the aforesaid state, the scanner 19 reads the front side (bottom surface) of the original. When the original has been read, it is transported leftward via the transport belt 506, forms a U-turn via the inverting roller 507, passes over the switching member 508, and is discharged to the discharge tray 511 via the discharge roller 509. At this time, the original is discharged with the read surface of the original (front side) facing upward.

The document scale 512 is preferably constructed so as to be movable between an operating position (position shown in FIG. 1) wherein said document scale 512 projects from the platen glass 18, and a retracted position wherein said document scale 512 is at the same height as or lower than the platen glass 18. For example, in the single-side mode, when an original is positioned so as to abut the document scale 512 on the platen glass 18, the document scale 512 is moved from the retracted position to the operating position. In the continuous duplex mode, on the other hand, the document scale 512 is moved to the retracted position when the back side of the original is being read.

The continuous single-side mode is described hereinafter. The continuous single-side mode is possible when, for example, making single copies, and the operation is connected to the scanning unit 10.

That is, the continuous single-side mode is identical with the aforementioned single-side mode until the original document passes the register roller 505, thereafter, however, the original is transported via the transport belt 506 at a constant speed corresponding to the copy magnification, said original passes the inverting roller 507 and the like, and is discharged to the discharge tray 511. During this time, the scanner 19 is stationary at the home position at the right end of the platen glass 18. The surface of the original is read while when said original is being transported over the scanner 19 on the glass platen 18.

Accordingly, the image reading process can be accomplished at high speed, without executing the scanning and return operation of the scanner 19 and the reverse rotation positioning of the original executed in the single-side mode.

In the continuous single-side mode, the scanner 19 remains stationary at the home position HP regardless of the size of the original document.

The continuous duplex mode is described hereinafter. The continuous duplex mode is identical with the aforesaid continuous single-side mode until the front surface of the original document has been read, and during which time the left end of the switching member 508 has been raised, such that said transporting original, the front side of which has been read, forms a U-turn via the inverting roller 507, passes underneath the switching member 508, and is again guided beneath the transport belt 506 in an inverted state wherein the front side and back side orientation is reversed.

During the time period described above, the scanner 19 is moved leftwardly at the moment the reading of the front surface of the original is completed, and is maintained at a reverse side reading position RP corresponding to the length of the original. The reverse side reading position is the position at which the leading end and the trailing end of the original coincide when the original forms a U-turn on the inverting roller 507. It is desirable that the reverse side reading position is set somewhat to the right from the position at which the leading end and the trailing end of the original coincide.

Figure 3:
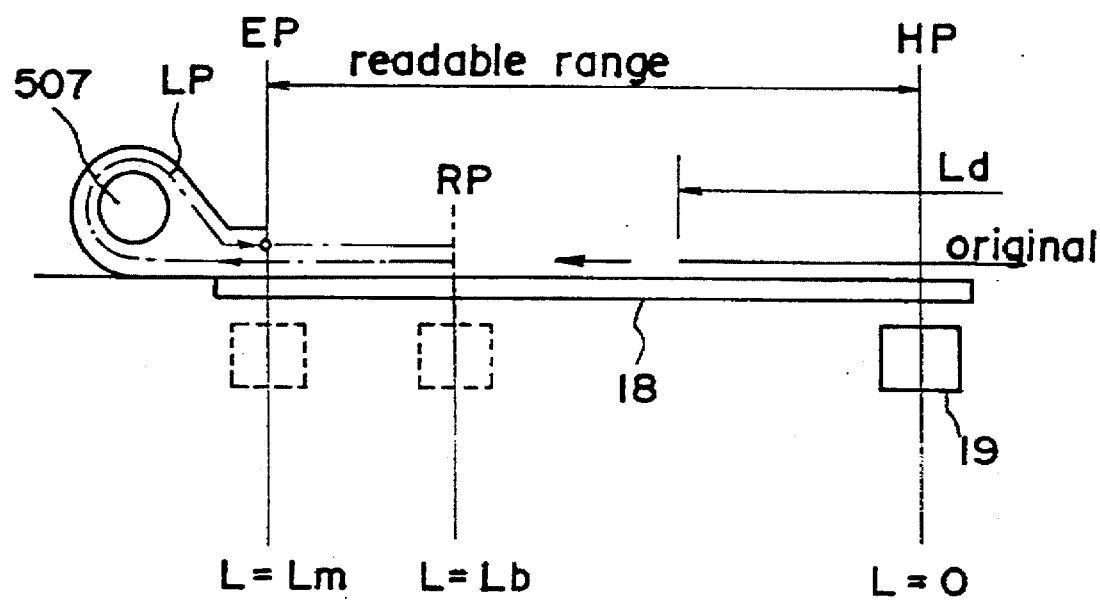

FIG. 3 shows the positioning controls for positioning the scanner 19.

The original document readable range of the scanner 19 extends from the origin position (home position) HP at the front edge of the platen glass 18 to the end position EP at the back edge of the platen glass 18. The front surface of the original is read at the home position HP. When the home position HP is set at L=0, the end position EP is set at L=Lm, wherein Lm is the effective length of the platen glass 18. In the present case, the value of Lm is 432 mm.

When the length of the inverting path, i.e., the path extending from the end position EP around the inverting roller 507 and returning again to the end point EP, is designated $L_p$, and the length of the original is designated $L_d$, the reverse surface reading position RP is expressed by the following Equation 1.

$$L=Lm-(Ld-Lp)/2 \quad (1)$$

The inverting path length $L_p$ is a value determined by the design of the apparatus. Since the original document length Ld is detected by the register sensor SE51 while the original is being transported, the length Lm=432 is applied, and the reverse surface reading position RP can be determined as L=432−(Ld−Lp)/2.

Accordingly, the reverse surface reading position RP changes in accordance with the length Ld of the original document. When the leading end and the trailing end of the original do not conform to the top surface (within the document reading range) of the platen glass 18 because the original is short, the left edge (end position EP) of the platen glass 18 is set at the reverse surface reading position RP, i.e., the maximum value of L is Lm.

The original, which is guided again below the transport belt 506, is transported rightward at uniform speed in accordance with the copy magnification via the inverted transport belt 506. During the aforesaid transport, the original passes above the scanner 19 which is waiting at the reverse surface reading position RP, such that the reverse surface of the original can be read during said transport.

At the moment the reading of the reverse original surface is completed, the transport belt 506 is reversely rotated to feed the original leftward, such that the original is inverted via the inverting roller 507 or is transported beneath the transport belt 506 rightward. When the left edge of the original arrives at the transport belt 506, said original is fed leftward so as to pass above the switching member 508 and inverting roller 507, and is discharged to the discharge tray 511 via the discharge roller 509. Thus, the original is discharged with the front surface in a face up orientation.

After the front surface of the original is read at the home position HP, the scanner 19 is moved and positioned at the reverse surface reading position RP. Thus, the reverse surface of the inverted original is rapidly read, thereby completing the reading to be accomplished in the shortest time relative to the length of the original, and further improving the overall copying speed.

Figure 2:
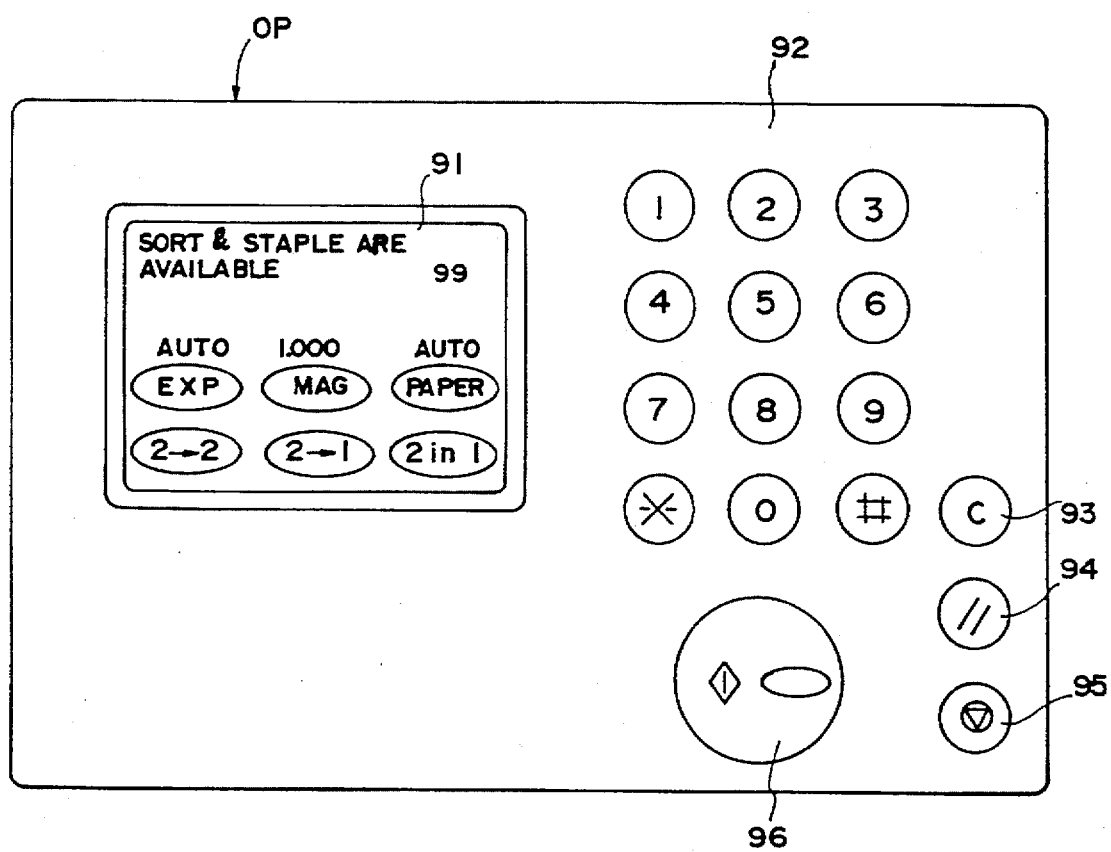

As shown in FIG. 2, the operation panel OP is provided with a liquid crystal touch panel 91, ten-key pad 92 for entering the copy set number and copy magnification, clear key 93 for returning the set number to a standard value of "1," panel reset key 94 for returning set value in the copying apparatus to standard values, stop key 95 for interrupting a copy operation, and start key 96 for starting a copy operation.

The liquid crystal touch panel 91 displays the various states of the copying apparatus 1 such as jam generation, service call generation, paper empty generation and the like, operation modes of the copying apparatus 1 such as exposure level, magnification, copy paper and the like, as well as various other information, and is also used to input the selection of the copy mode, e.g., single-side copy mode, continuous duplex copy mode, two-in-one mode and the like, as well as copy magnification and copy paper selection.

The control portion 100 is described hereinafter.

Figure 4A:
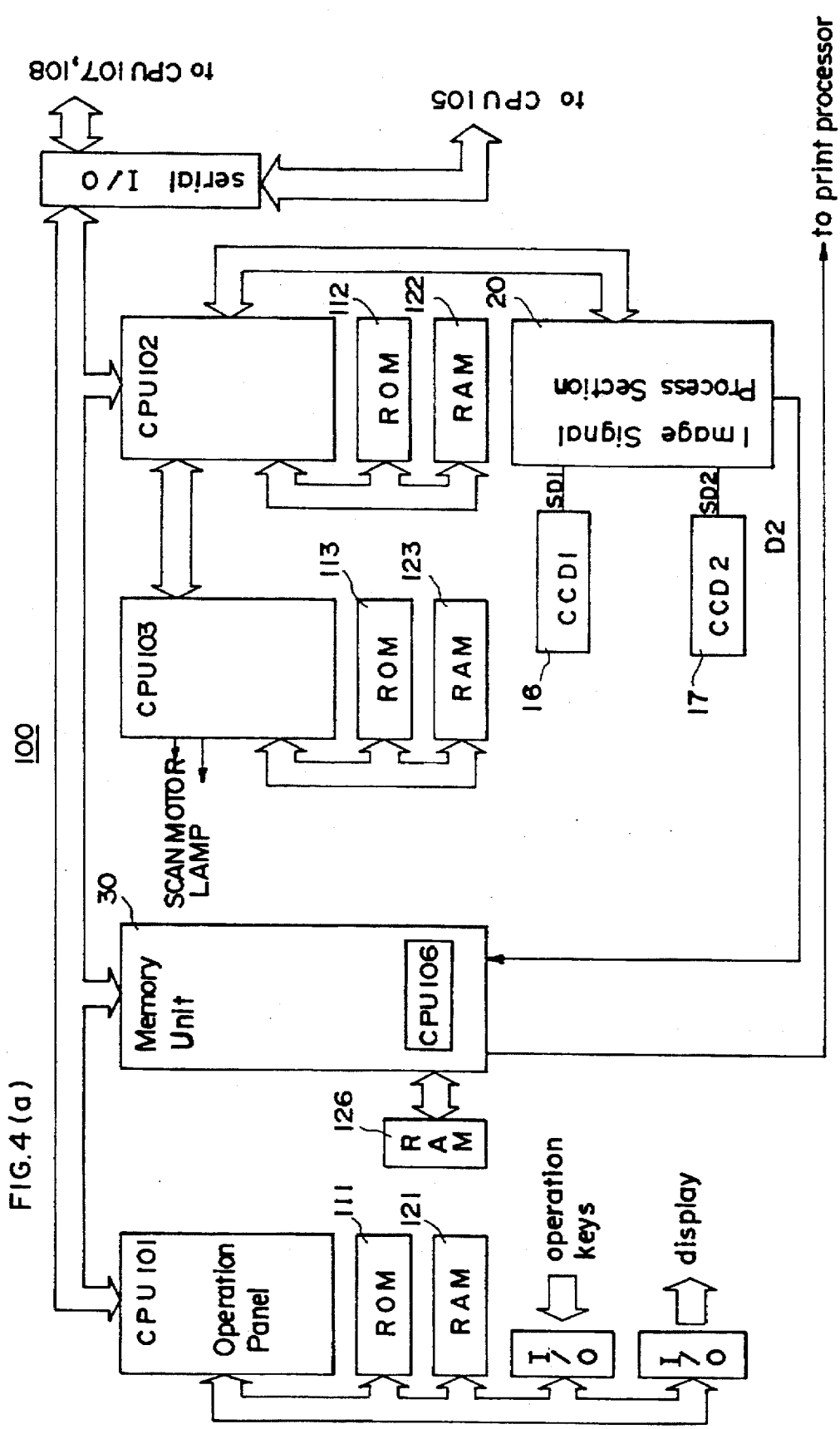
FIGS. 4a and 4b are block diagrams showing the construction of the control portion of the copying apparatus.
Figure 4B:
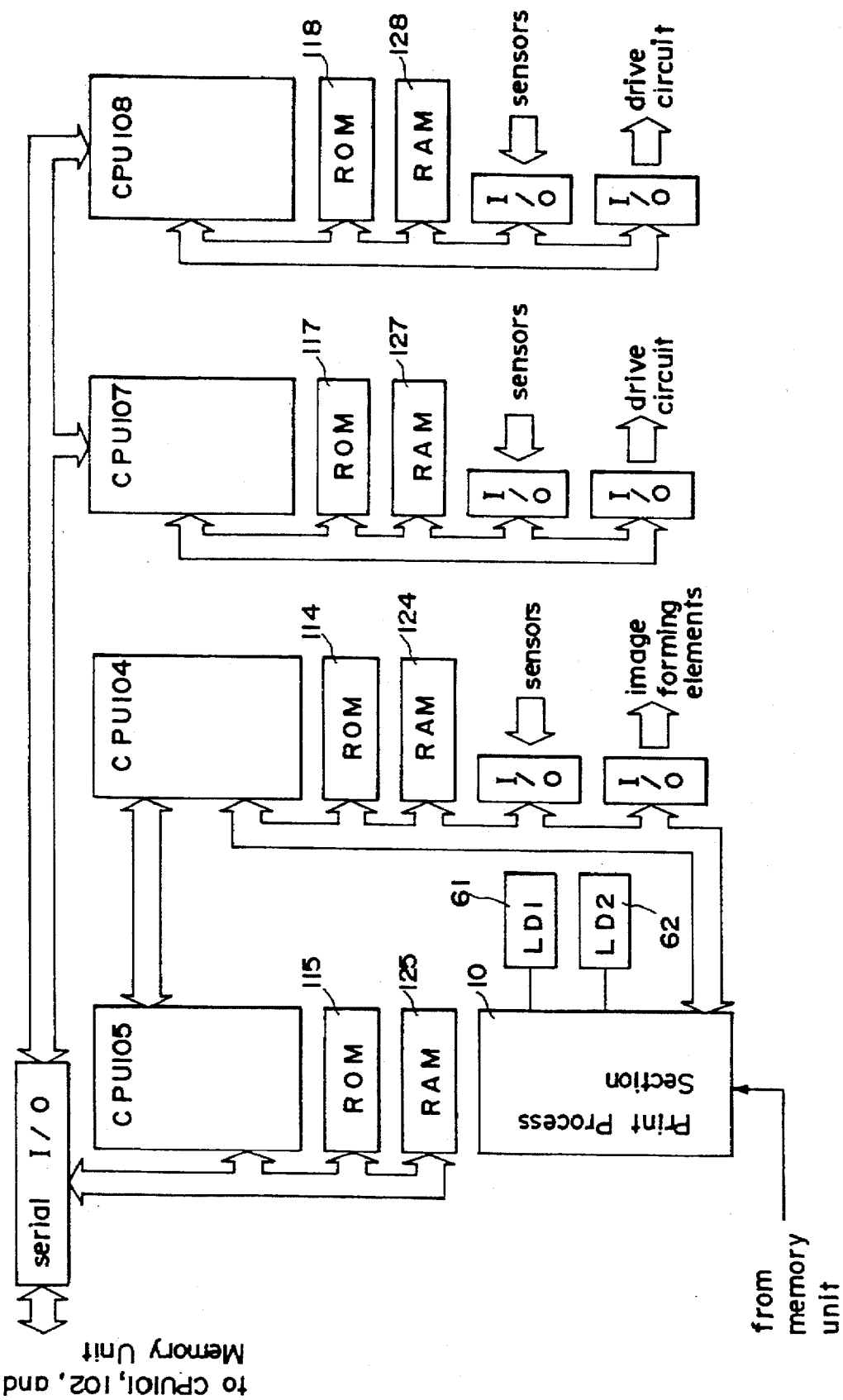
Figure 5:
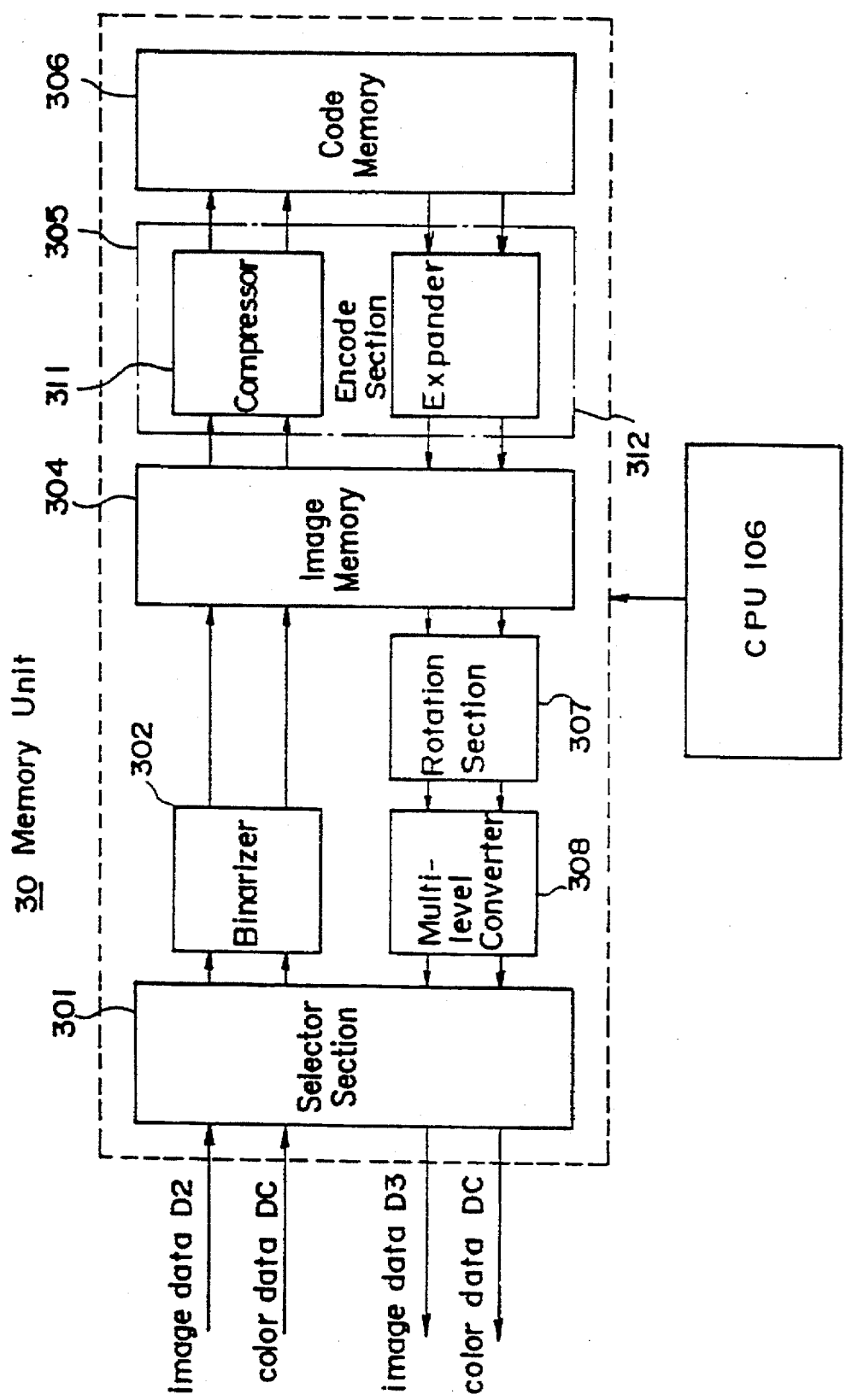
Figure 6:
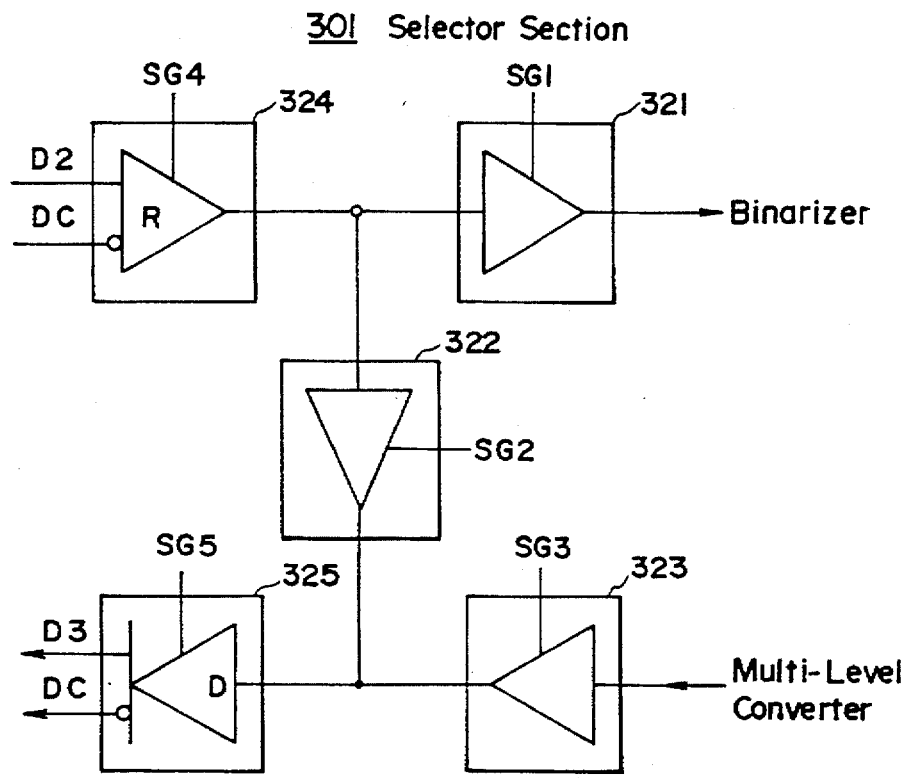

FIGS. 4 and 5 are block diagrams showing the construction of the control portion 100 of the copying apparatus 1.

The control portion 100 centrally comprises eight individual central processing units (CPU) 101~108. Each of the CPUs 101~108 are provided with read only memories (ROM) 111~118 for storing their respective programs, and random access memories (RAM) 121~128 provided with work areas for program execution. The CPU 106 is provided within the memory unit section 30.

The CPU 101 executes controls related to the displays and the input of signals from the various operation keys of the operation panel OP. The CPU 102 executes controls for each portion of the image signal process section 20. The CPU 103 controls the drive of the scanning unit 10. The CPU 104 controls the print process section 40, optical unit 60, and the image forming unit 70. The CPU 105 executes the processes to set operation mode and adjust the general timing of the control portion 100.

The CPU 106 temporarily stores the read image data into memory (image memory 304) via the control of the memory unit section 30, the stored image data are read, and output to the print processing section 40. Thus, the image reading device IR and the printing device PRT are independently controlled so as to improve the copying speed.

The CPU 107 controls the original document feeding portion 500, and the CPU 108 controls the refeeding portion 600. Serial communications among the aforesaid CPUs 101~108 are accomplished via interrupts, such that commands, reports and other data are exchanged.

The various processing sections for processing image data are described hereinafter.

The image signal processing section 20 comprises an analog-to-digital (A/D) converter, shading correction section, color discriminating section for discriminating the color of picture elements of the original based on the image data, variable magnification processing section, image quality correction section and the like.

The image signals SD1 and SD2 input from the photoelectric converting elements 16 and 17 via the image signal processing section 20 are quantified as 8-bit image data for each pixel, and after the various processes are executed, the image data are output as image data D2. Furthermore, the 1-bit color data DC expressing whether or not the color is a specific color are output for each pixel of the image data D2.

In the continuous duplex node, the image signals SD1 and SD2 corresponding to the front side of the original are output continuously while the original is transported past the scanner 19 which is stationary at the home position. Furthermore, the image signals SD1 and SD2 corresponding to the reverse side of the original are continuously output while the original is transported past the scanner 19 which is stationary at the reverse side reading position RP.

The image signal processing section 20 continuously receives the image signals SD2 corresponding to the front side, continuously processes said signals, and outputs the image data D2 corresponding to the front side. After the processing of the image data relative to the front side of the original is completed, the image signals processing section 20 continuously receives the image signals SD1 corresponding to the reverse side, continuously processes said signals, and outputs the image data D2 corresponding to the reverse side.

FIG. 5 is a block diagram showing the memory unit section 30.

The memory unit section 30 comprises selector section 301, binarizer 302 for creating binary data based on the parameters settings from the CPU 106, multi-port image memory 304 provided with a capacity for two-page segments of A4 size at 400 dpi (dots per inch), encode section 305 provided with individually operable compressor 311 and expander 312, code memory 306 with multiple ports, rotation section 307, multi-level converter 308 for creating multi-level data (a plurality of bits per pixel) based on the parameter settings from the CPU 106, and a CPU 106 which executes the general control for the aforesaid components.

The selector section 301 comprises five bus gates 321–325, as shown in FIG. 6a. These bus gates 321–325 are controlled by the control signals SG1–SG5 output from the CPU 106.

The control signals SG1–SG5 are switchable between active and non-active in accordance with the operation mode. The image data flow is controlled via the combination of the aforesaid control signals SG1 through SG5. FIG. 6b shows the relationship of the various control signals and the operation modes.

When the image data D2 are written into the image memory 304, the encode section 305 reads said data therefrom to create compressed encoded data which are written into the code memory 306. The code data written to the code memory 306 are read therefrom upon command from the CPU 106, and expanded to create the image data which are then written to the image memory 304.

When a one-page segment of image data are generated in the image memory 304 via the aforesaid expansion, said data are read and rotation processes as necessary in the rotation section 307. Multi-level image data are generated in the multi-level converter 308, and are then output as image data D3. The compressor 311 and the expander 312 are mutually independent so as to be capable of parallel operation. Data are transmitted between the compressor 311, expander 312 and the code memory 306 via direct memory access (DMA).

The memory unit section 30 contains the operation modes, i.e., direct mode, memory mode, direct and memory (mix) mode. The memory mode includes two operation, i.e., the memory mode write operation and a memory mode read operation. The mix mode mixes the direct mode and the memory mode.

In the direct mode, the image data D2 output from the image signal processing section 20 are output directly to the print processing section 40 as image data D3.

In the memory mode, the image data D2 are binarized, then fetched to the image memory 304 where predetermined processing is executed, and output as needed from the image memory 304 to the print processing section 40 as the image data D3.

That is, in the memory mode, the image data D2 and the color data DC are output to the binarizer 302 while the memory mode writing operation is being executed (from the reader to the memory). After binarization, the data are written to the image memory 304, compressed, and then written to the code memory 306.

During the memory mode reading operation (from memory to the printer), the expanded image data transmitted from the image memory 304 are read, and output as image data D3 and color data DC.

In the mix mode, the image data D2 and the color data DC are output directly to the print processing section 40 as image data D3 and color data DC, and at the same time the image data D2 and color data DC pass through the binarizer 302 and are written to the image memory 304.

The aforesaid operation modes of the memory unit section 30 are automatically selected in accordance with the copy mode.

Practical examples showing the relationship between the original document reading operation and the copy paper printing operation are described hereinafter.

First is described the single-side copy mode for copying two sheets of two-sided originals to one side of four copy papers (duplex original single-side copy mode). Two sheets of originals are placed face up on the feed tray 510, and the front and reverse sides of the second original (last sheet), then the front and reverse sides of the first original are sequentially read, and the data are stored in the memory unit section 30.

At the moment the reading of the reverse side of the second original is completed, the image data corresponding to the reverse and front sides of the second original and the reverse and front sides of the first original are read from the memory unit section 30 in this order and the printing operation is executed. The data are respectively printed on the front sides of four copy sheets which are sequentially discharged.

Next is described the two-side copy mode for copying two sheets of two-sided originals to both sides of two copy papers (duplex original duplex copy mode). In this case, the original reading operation and the operation for reading from the memory unit section 30 are identical to the operation described above for the single-side copy mode. In the printing operation, however, the image data read from the memory unit section 30 are sequentially printed to the front side and reverse side of a first copy sheet, and the front side and the reverse side of a second copy sheet which are then discharged.

Next is described the single-side composite copy mode for copying two sheets of two-sided originals to one side of two copy papers (duplex original two-in-one copy mode). In this case, the original reading operation is identical to that of the previously described single-side copy mode.

In the printing operation, however, the front side and reverse side of the second original and the front side and reverse side of the first original are sequentially read from the memory unit section 40, and the respective data for the front and reverse sides are sequentially printed on the first half portion and the second half portion of the front side of a first copy sheet and the first half portion and the second half portion of the front side of a second copy sheet. The copy sheets are then discharged.

In the copying apparatus 1 of the present embodiment, the image reader IR and the printer PRT are independently operable, such that the print sequence is unaffected by the original reading sequence. Therefore, the writing (when reading the original) and reading (when printing) in the memory unit section 30 are executable in parallel operation with the original reading and printing to the copy paper via the independent circuit blocks. This arrangement increases the copying speed and improves production.

The operation of the copying apparatus 1 is described hereinafter with reference to the flow charts.

Figure 7A:
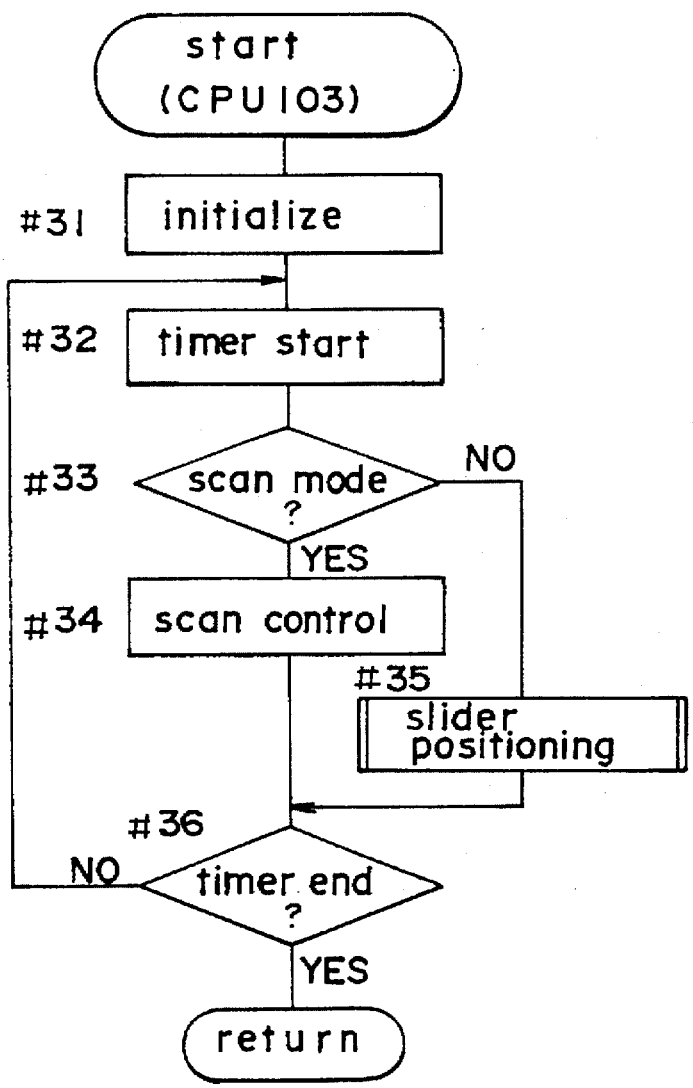
FIGS. 7(a) and 7(b) are a flow chart showing the main routine of the CPU 103.
Figure 7B:
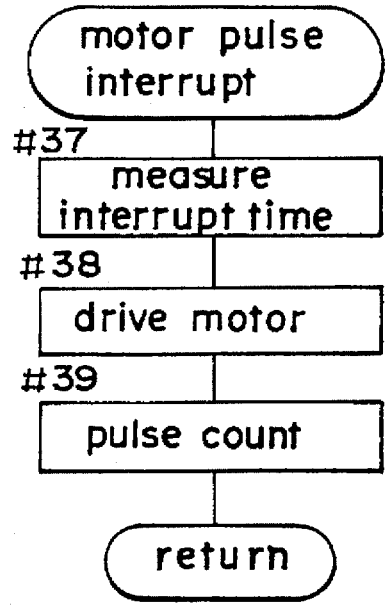

FIG. 7 is a flow chart showing the main routine of the CPU 103.

The CPU 103 controls the scanning unit 10. When the scanning mode is set (step #33: YES), scan controls are executed to control the scanning performed by the scanner 19 (step #34). When the continuous copy mode is set (step #33: NO), the slider positioning controls are executed (step #35).

Furthermore, when motor pulse interrupts are generated via motor pulses generated synchronously with the rotation of the scan motor M2, the interval of said motor pulse interrupts is measured (step #37), power to the motor is switched ON/OFF (step #38), and the number of motor pulses is counted (step #39).

Figure 8:
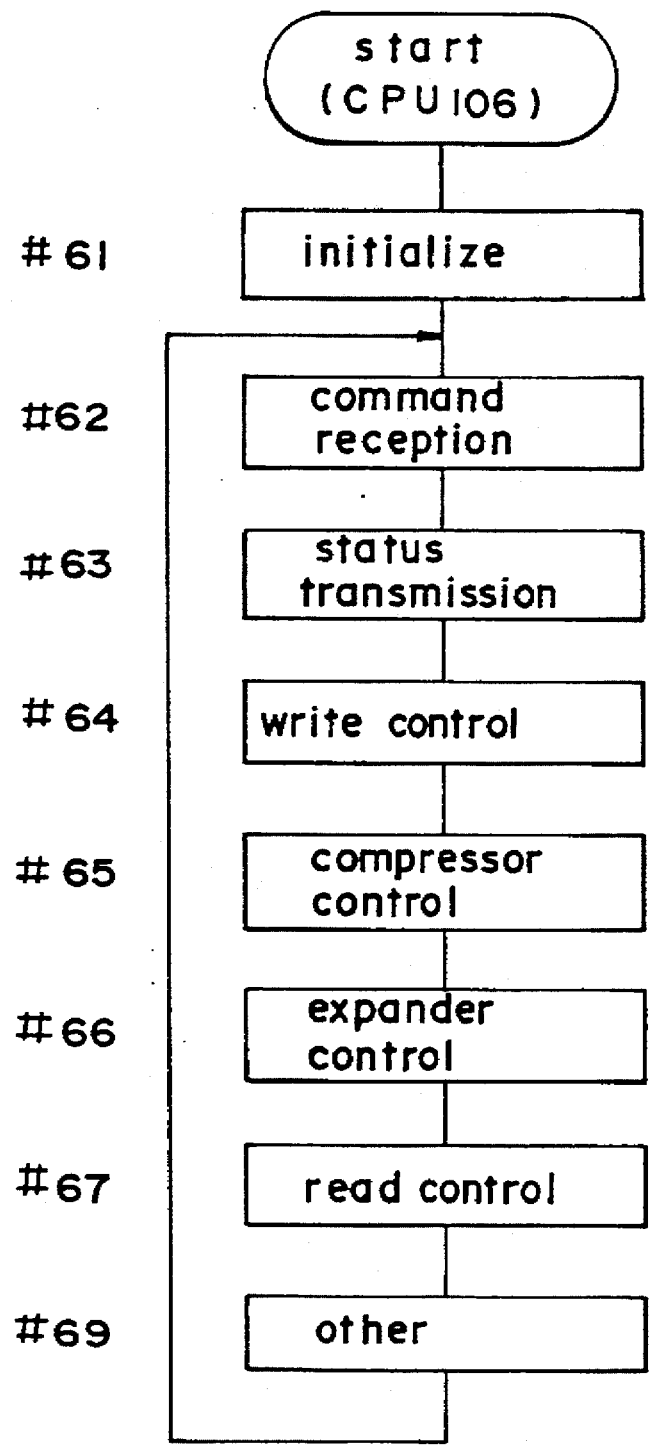

FIG. 8 is a flow chart showing the main routine of the CPU 106.

The CPU 106 controls the memory unit section 30. Command reception processing is executed for commands received from the other CPUs (step #62), status transmission processing is executed (step #63), write controls are executed for writing to the image memory 304 (step #64), compressor controls are executed (step #65), expander controls are executed (step #66), and read controls are executed for reading from the image memory 304 (step #67).

Figure 9:
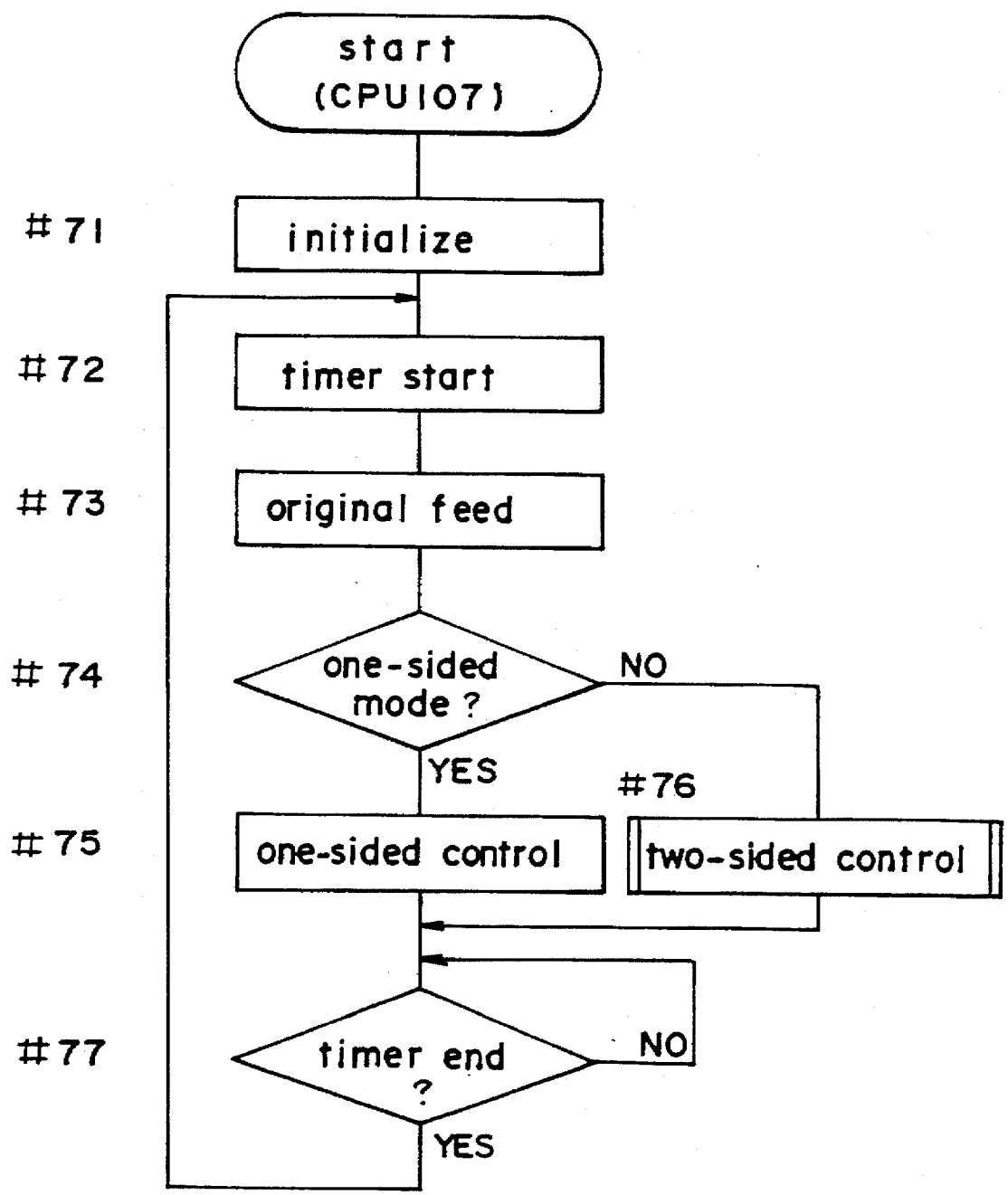

FIG. 9 is a flow chart showing the main routine of the CPU 107.

The CPU 107 controls the document feeding portion 500. The original feed process is executed to control the feeding of the original by taking up the original, correcting the inclination of said original and transporting said original to the transport belt 506 (step #73). When the single-side original mode is set (step #74: YES), the one-sided original control process is executed (step #75). When the duplex original mode is set, the two-sided original control process is executed (step #76).

In steps #75 and #76, controls are executed to position the original at a predetermined reading position via the transport belt 506, transport said original to the inverting roller 507, and either discharge the original that arrives at the inverting roller 507, or refeed said original again to the transport belt 506. The contents of the aforesaid respective controls differ in accordance with a single-side original and a duplex original. The process of step #76 is described in detail in the subroutines mentioned later.

Figure 10:
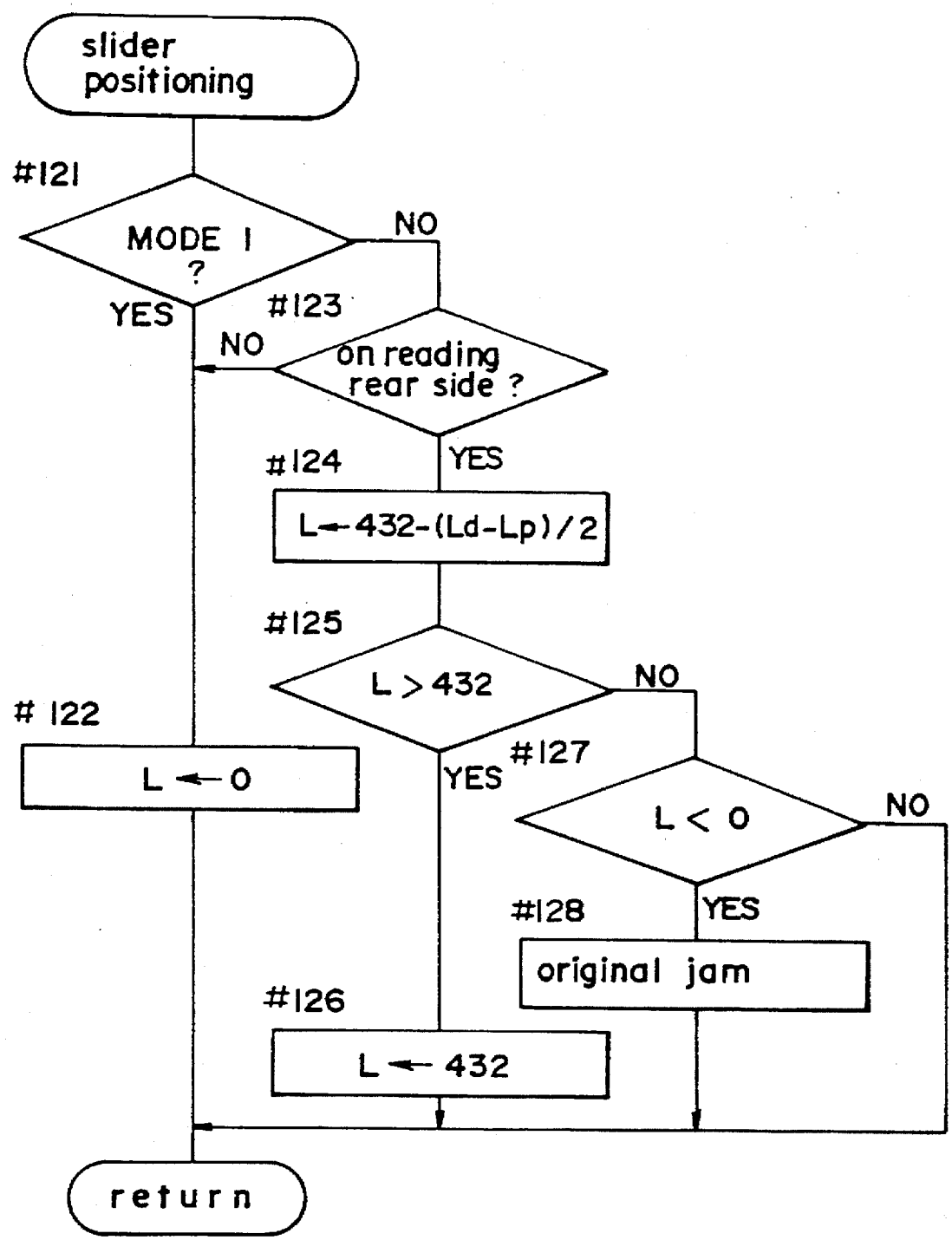

FIG. 10 is a flow chart showing the slider positioning process of step #35.

First, when the continuous single-side mode (mode 1) is set (step #121: YES), the standard position L at which the scanner 19 is held is set at the origin position (home position) HP, such that L=0, because only the front surface of the original is read (step #122).

In the continuous duplex mode (mode 2) (step #121: NO), when the original, the front side of which is being read, has passed the original position HP (step #123: YES), the standard position L is set at the reverse side reading position, such that L=432−(ld−Lp)/2 (step #124). If the reverse side reading position is set, the reverse side of the original is readable without interfering with the trailing end portion of the original.

When the standard position L set in step #124 exceeds [432], the standard position L is set at 432 (step #125, #126). Furthermore, when the standard position L is a negative value, it is assumed that an original feeding abnormality has occurred, i.e., an original jam, such that the process is stopped (steps #127, #128).

Figure 11A:
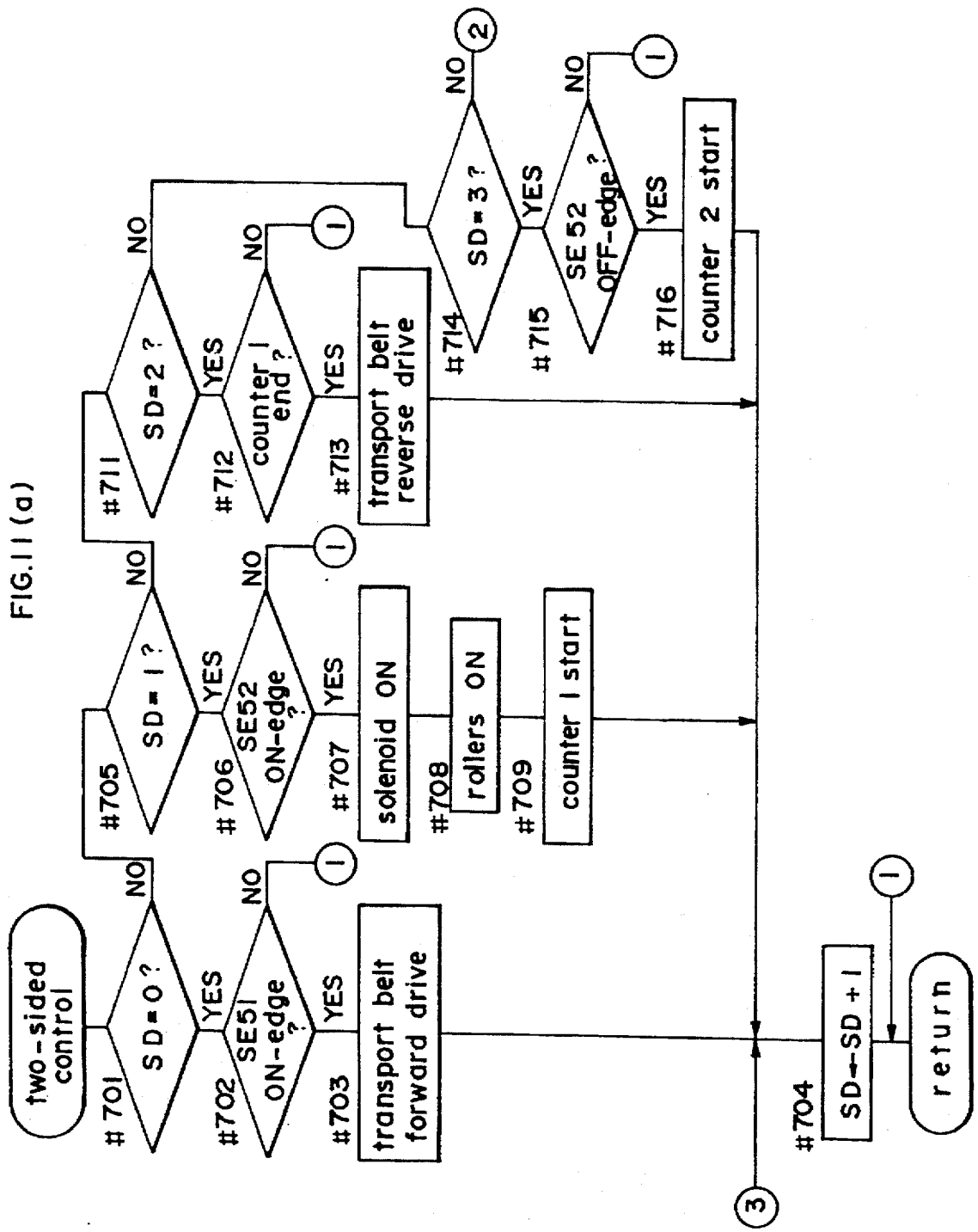
FIGS. 11a through 11c are a flow chart showing the duplex original feed control process.
Figure 11B:
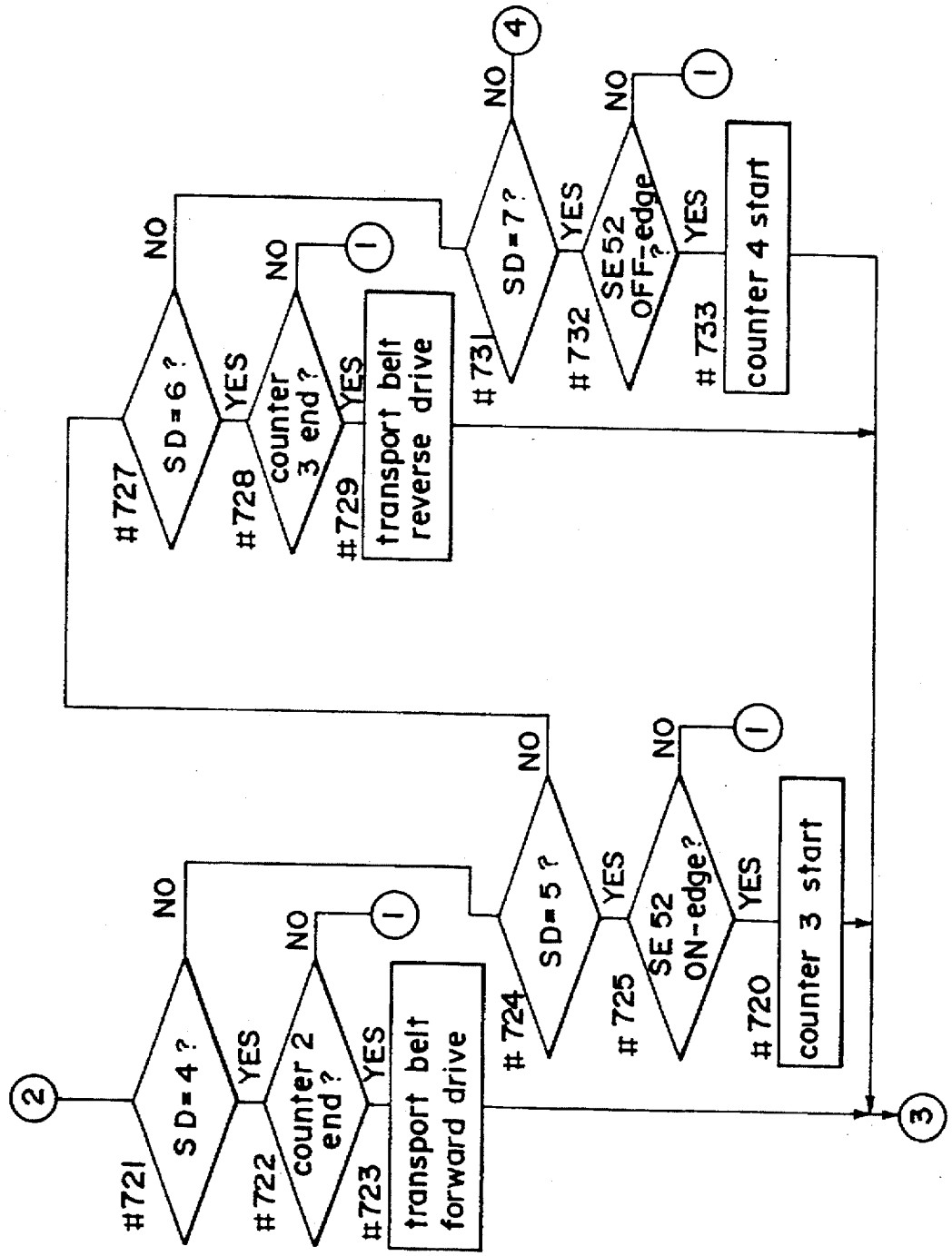
Figure 11C:
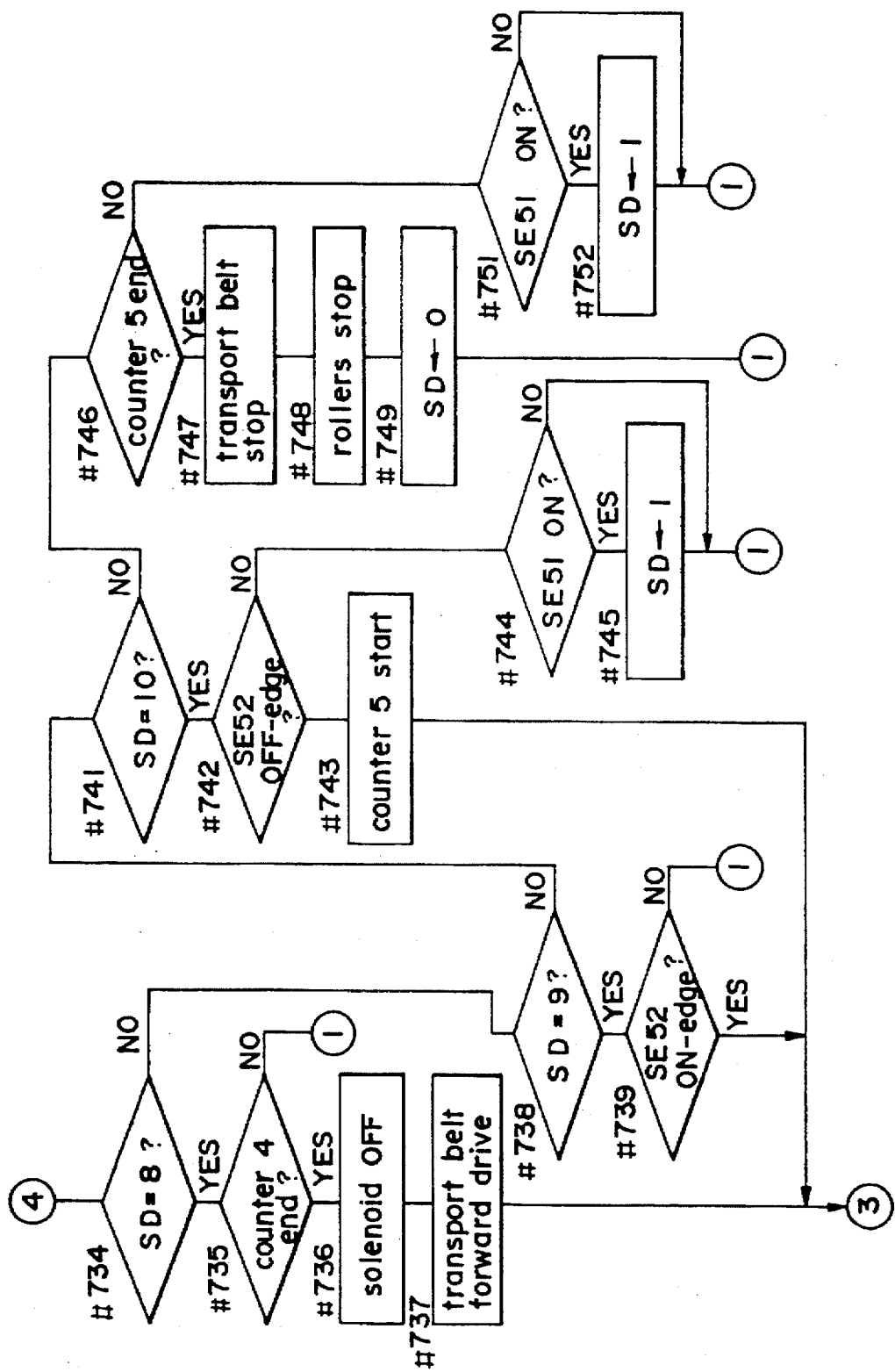

FIGS. 11a~11c are a flow chart showing the two-sided original control process executed in step #76. In this subroutine, when the continuous duplex mode (mode 2) is set, controls are executed such that the originals are discharged to the discharge tray 511 after they reach the register sensor SE51 of the document feeding portion 500.

The document feeding portion 500 is driven by a motor not shown in the drawings, and the actuation of the transport belt and the various rollers is accomplished by transmitting the motor drive force through the clutches. The amount of rotation of each roller, i.e., the amount of travel of the original, is determined by calculating the amount of rotation of the motor by means of motor pulses. The speed control of the aforesaid motor is accomplished identically to that of the scanning motor M2.

An original that reaches the register sensor SE51 is transported leftward beneath the transport belt 506 (steps #701~703). At this time, the image on the front side of the original is read by the scanner 19 which is stationary at the home position HP.

When the original reaches the discharge sensor SE52, the switching member 508 is switched via a solenoid (step #707), the original is inverted front-to-back by forming a U-turn via the inverting roller 507 (step #708), and this time the original is transported rightward beneath the transport belt 506 with the reverse side of the original facing downward (step #713). At this time, the image on the reverse side of the original is read by the scanner 19 which is stationary at the reverse side reading position RP.

After the trailing end of the original passes the discharge sensor SE52 (step #715: YES), the original is transported only a distance controlled by the motor pulse counter 2 (steps #716, #722). At this time, the trailing end of the original reaches the reverse side reading position RP, and the reading of the reverse side of the original is completed.

Finally, the original inverting operation is executed in the same manner as described above (steps #723~737). When the original has been discharged with the front side of the original facing upward (step #746: YES), the drive system is stopped (steps #747, #748).

After the leading end of the original is detected during the discharge process (step #739: YES), the feeding of the next original is awaited and when a next original is detected (steps #744, #751: YES), processing continues and the feeding operation is executed (steps #745, #752).

The motor pulse counters 1 and 3 are fixed value counters dependent on the length Lp of the inversion pulse, whereas the motor pulse counter 2 is a variable value counter dependent on the length Ld of the original document, and may have a minimum value that allows the inverted original, which has been inverted front-to-back by the inverting roller 507, to completely pass the reverse side reading position RP. Furthermore, the motor pulse counter 4 may be set at a minimum value that allows the trailing end of the original to arrive below the transport belt 506 to be transported to the inverting roller 507 via the forward rotation of said transport belt 506. The motor pulse counter 4 has a fixed value which differs from the fixed value of the aforesaid counter 2.

Although in the previously described embodiment the transport path extends along the top surface of the platen glass, it may alternatively a transport path comprising a single empty space, or a transport path having an arrangement of transparent guide members, curved guide members, plurality of rollers and the like. The aforesaid embodiment has been further described as reading both sides of an original, but may also read only one side (reverse side) of originals. A reading section provided with a sealed type image sensor and the like may be used in place of the scanner 19.

Second Embodiment

In the copying apparatus of the First Embodiment, a single scanning unit 10 is used to read the images of the first and second sides of an original. In the Second Embodiment, the copying apparatus is provided with two image reading means, wherein one image reading means reads a first side of an original, and a second image reading means reads the second side of the original. The First Embodiment and the Second Embodiment have many parts in common. These like parts are designated by like reference numbers and their description is omitted from the following discussion.

Figure 12:
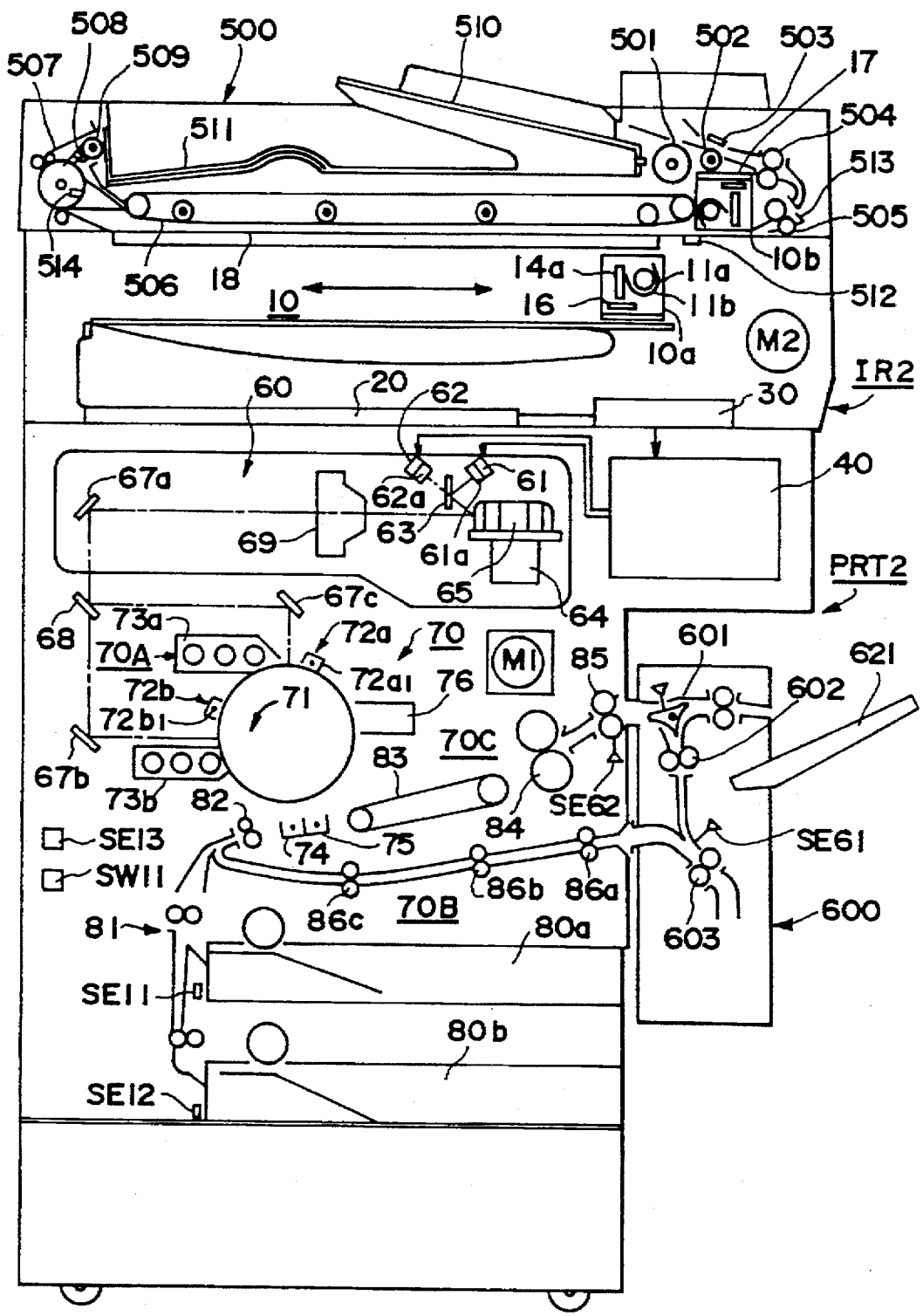

FIG. 12 shows the general construction of the copying apparatus 1000 of the Second Embodiment. The copying apparatus 1000 comprises an image reader IR2 and a printer PRT2.

The printer PRT2 has a construction identical to that of the printer PRT of the First Embodiment. Thus, the description is omitted in the following discussion.

The image reader IR2 is provided with a scanning unit 10 including an image reading portion 10a specifically for reading the front side of originals, and an image reading portion 10b specifically for reading the reverse side of originals.

The respective image reading sections 10a and 10b are provided with exposure lamps 11a and 11b for illuminating originals, lens array 14a, and photoelectric converter elements 16 and 17 comprising CCD (charge-coupled device) image sensors.

The image reading section 10a reads the front side of the originals and scans from beneath the platen glass 18. The other image reading section 10b reads the reverse side of the originals and is fixedly arranged immediately behind the register roller 505 inside the document feeding portion 500a.

The operation of the document feeding portion 500a varies in accordance with the selected image reading mode. Image reading modes include scanning modes via scanning operation of the image reader section 10a, and continuous modes wherein the fed originals are scanned during transport while the image reader section 10b remains stationary.

Accordingly, the document feeding portion 500a operation is capable of single-side scan mode (hereinafter referred to as "single-side mode"), continuous single-side mode, and continuous duplex mode depending on whether or not one side or two sides of the original is being read.

In the single-side modes, one sheet or a plurality of sheets of an original are placed in the document tray 510 with the side to the read facing up. When the operation starts, the originals stacked on the document tray 510 are fed sequentially by the feed roller 501 from the lowermost sheet which is transported by the handling rollers 502 and 503, passes the intermediate roller 504, the inclination of the original is corrected by the register roller 505, and the original is delivered onto the platen glass 18 via the transport belt 506, such that immediately after the trailing edge of the original has past the left edge of the document scale 512, the transport belt 506 is slightly reverse rotated and stopped.

Thus, the right edge (trailing edge) of the original abuts the edge of the document scale 512 so that the original is precisely positioned on the platen glass 18. At this time, the leading edge of the next original arrives at the register roller 505 so as to shorted the time required for transporting said next original.

In the aforesaid state, the image reader 10a scans the front side (bottom surface) of the original to read the image thereon. When the image reading ends, the original is transported leftward by the transport belt 506 and forms a U-turn at the inverting roller 507, passes above the switching member 508 and is discharged to the discharge tray 511 via the discharge roller 509. At this time, the original is discharged with the scanned surface (front side) of the original face up.

The continuous single-side mode is described hereinafter. The continuous single-side mode allows, for example, the making of single copies, and the operation of the single-side mode is connected with the scanning unit 10.

That is, the operation is identical to that of the previously described single-side mode as far as the passage of the original past the register roller, but thereafter, the original is transported by the transport belt 506 at a uniform speed in accordance with the copy magnification, the original is fed past the inverting roller 507 and discharged to the discharge tray 511. During the aforesaid operation, the image reader 10a is held stationary at the right edge of the platen glass 18, such that the image on the front surface of the original is read as the original is transported above the platen glass 18.

Accordingly, the reverse rotation positioning of the original executed in the single-side mode, as well as the scanning and return operations performed by the image reader 10a are not executed, thereby increasing the speed of the reading operation.

In the continuous duplex mode, immediately after the original has past the register roller 505, the image on the reverse side of the original is read by the image reader 10b. Thereafter, the operation is identical to that of the previously described single-side scan mode, wherein the image on the front side of the original is read via scanning by the image reader 10a. That is, in the continuous duplex mode, only the reverse side of the original is read continuously. Continuous reading of the images on both sides of duplex originals is accomplished by the high speed mode which is described below.

Figure 14:
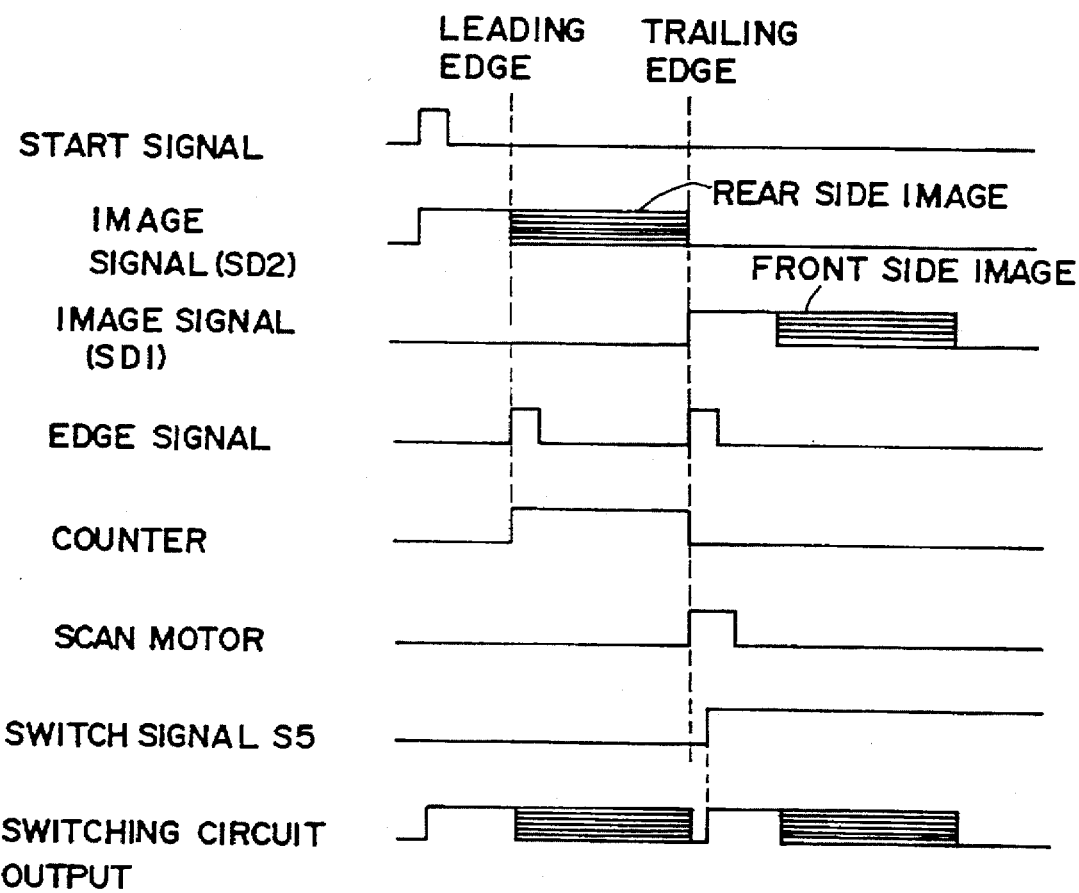

The high speed mode is described hereinafter with reference to FIGS. 14–16.

In the high speed mode, the front side and the reverse side of duplex originals are sequentially read continuously by the two image readers 10a and 10b. In this case, the length of the original is detected when the reverse side of the original is read by the image reader 10b, and the image reader 10a is moved to an image reading position RPa corresponding to the detected length of the original, such that the front side of the original is continuously read at the image reading position RPa.

The method for detecting the length of the original by the image reader 10b is described hereinafter.

In the document feeding portion 500a, the surface of the feed path opposite the image reader 10b is painted black. When no original is present, the image reader 10b (photoelectric converter element 17 output signal SD2) detects the black level across the entire area in the main scan direction.

When an original is fed, the output signal SD2 of the photoelectric converter 17 changes from the black level to the white level. The point of this change is detected as the leading edge of the original; at the same time, the clock signal counting operation is started via the document length counter.

Thereafter, when the output signal SD2 of the photoelectric converter 17 detects the change point from the white level to the black level across the entire area in the main scan direction, this change point is detected as the trailing edge of the original, and the document length counter operation is stopped. Since the clock signal cycle and document transport speed are constant, the count value of the document length counter at this time is a value corresponding to the length of the original.

In the high speed mode, the output of the photoelectric converter 17 of the image reader 10b is selected via the switching circuit 201 and is input to the A/D converter 202. In this state, the reverse side of the originals can be continuously read by the image reader 10b.

At the same time the trailing edge of the original is detected, the scan motor M2 is actuated, and the image reader 10a held at the home position (position shown in FIG. 1) is moved to the image reading position RPa. The image reading position RPa is at a distance from the home position of the image reader 10a that is virtually equal to the length of the original. For example, the reading position RPa may be set a few millimeters to a few centimeters beyond the original length Ld from the reading position RPb of the image reader 10b. The reading position RPa is set at position as near as possible to the home position in consideration of positioning precision and speed in moving the image reader 10a. The movement of the image reader 10a to the reading position RPa is accomplished based on the count value of the previously described document length counter.

The moving speed of the image reader 10a is set so as to be greater than the original document transport speed. The image reader 10a moving speed value is set such that the movement from the home position of the image reader 10a to the reading position RPa is faster than the movement to the reading position RPa after the trailing edge of the original is detected.

After the trailing edge of the original is detected, the selector signal S5 is output to the switching circuit 201, which selects the output of the photoelectric converter 16 of the image reader 110a, and is input to the A/D converter 202. In this state, the front side of the originals can be continuously read by the image reader 10a.

In the high speed mode, therefore, both sides of the originals are read continuously. After the reverse side image reading ends, the front side of the originals are read at a reading position RPa corresponding to the original length, such that various sizes of originals can be read in the shortest possible time.

Since the image signals SD1 and SD2 output from the photoelectric converters 16 and 17 are switched by the switching circuit 201 and are sequentially input to the A/D converter 202, a page memory is not required to adjust the timing.

When reading both sides of the originals, each of the image readers 10a and 10b are operated in time series, such that the image signals output from the respective photoelectric converters 16 and 17 may be switchably output via the switching circuit 201. Thus, the image signal processing section 20 uses only one processing circuit system.

Figure 13:
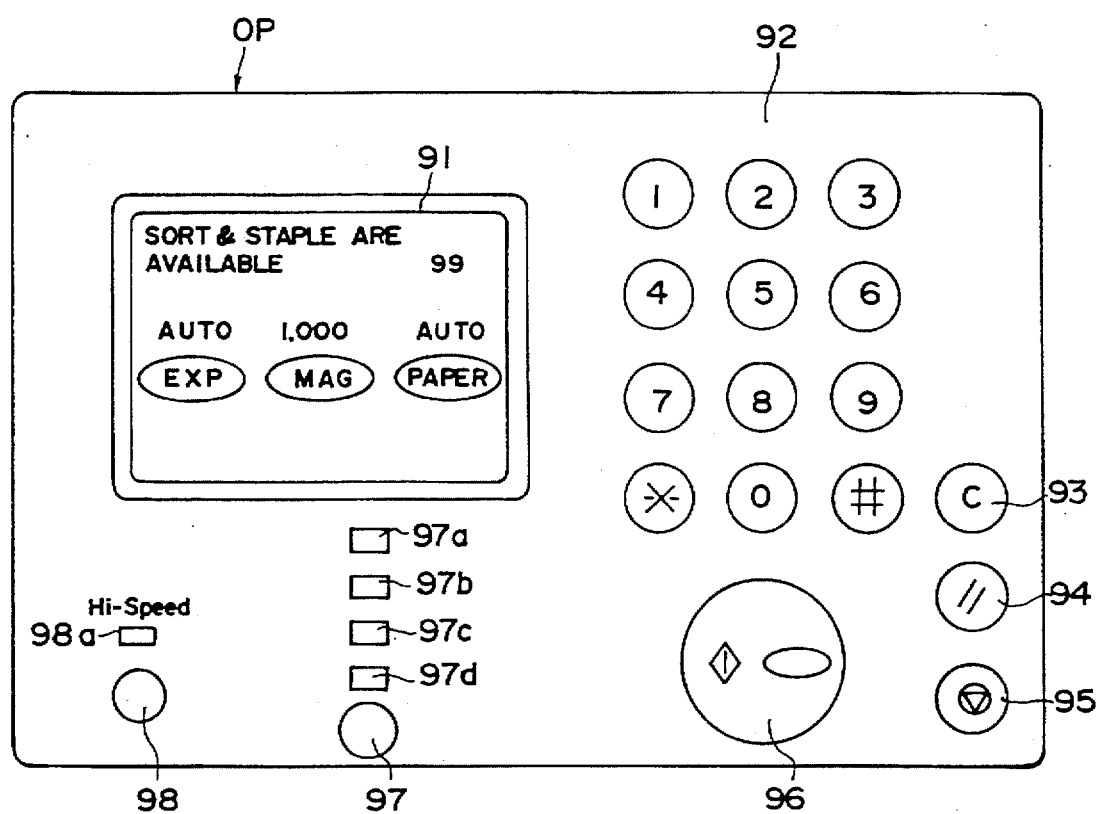

Returning now to FIG. 13, the operation panel OP is provided with a liquid crystal touch panel 91, ten-key pad 92 for entering the copy set number and copy magnification, clear key 93 for returning the set number to a standard value of "1," panel reset key 94 for returning set value in the copying apparatus to standard values, stop key 95 for interrupting a copy operation, start key 96 for starting a copy operation, mode set key 97 for setting the copy mode, and mode displays 97a through 97d for displaying the selected copy modes.

The operation panel OP is further provided with a high speed mode set key 98 for setting the high speed mode, and a high speed display 98a.

The liquid crystal touch panel 91 displays the various states of the copying apparatus 1 such as jam generation, service call generation, paper empty generation and the like, operation modes of the copying apparatus 1 such as exposure level, magnification, copy paper and the like, as well as various other information, and is also used to input the selection of the copy mode.

The construction of the control portion of the copying apparatus 1000 is essentially identical to that of the First Embodiment (FIG. 4) with the exception of the programs stored in the ROM and is, therefore, omitted from the present description. The controls executed by the individual CPUs 101~108 of the copying apparatus 1000 are different from those of the First Embodiment and are described in detail later.

The various processing section for processing the image data are described hereinafter.

Figure 15:
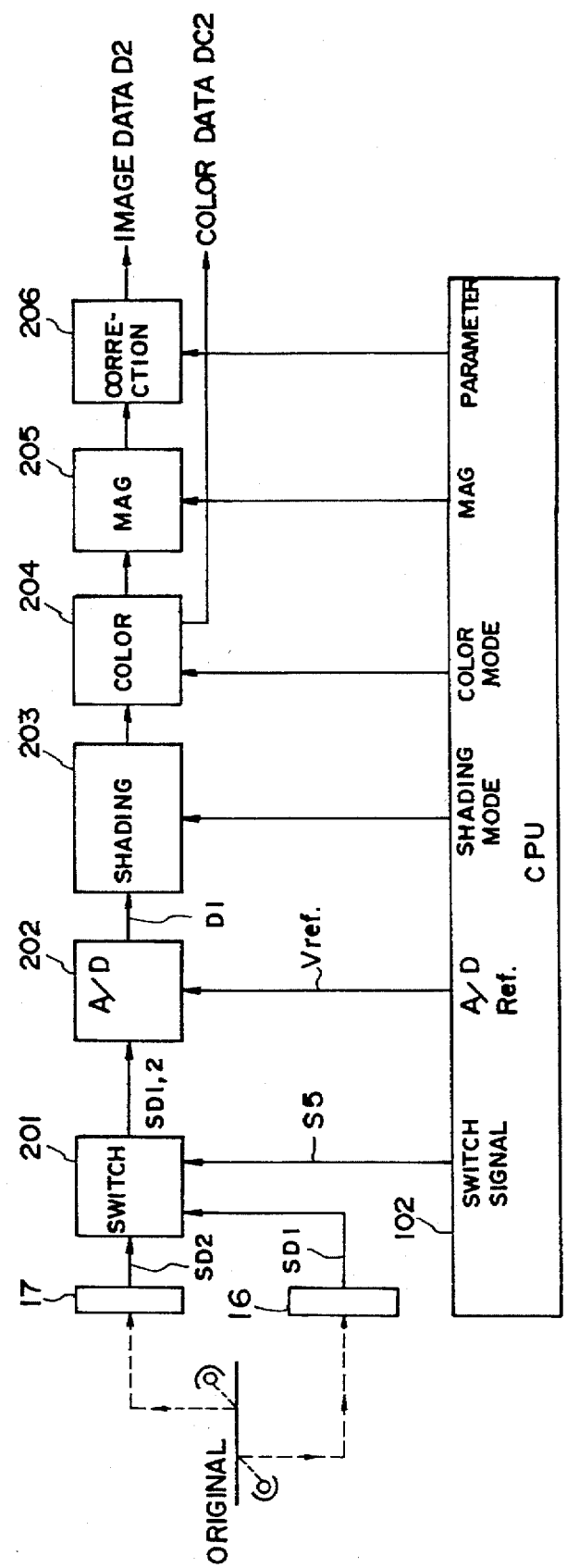
Figure 16:
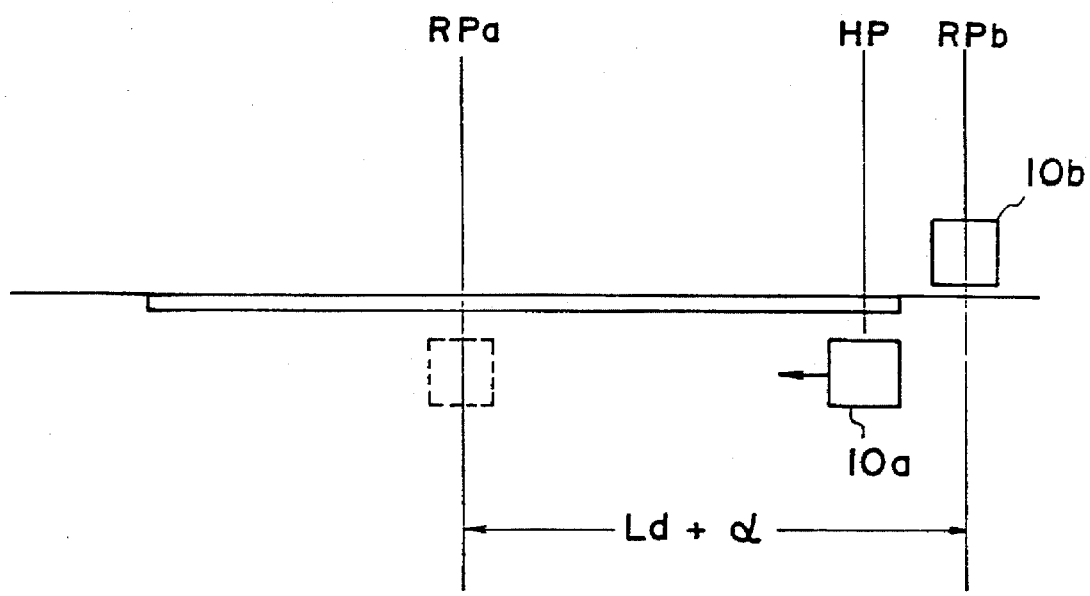

FIG. 15 is a block diagram showing the image signal processing section 20.

The image signal process section 20 comprises a color discriminating section 204, variable magnification process section 205, and image quality correction section 206.

The image signals SD1 and SD2 are analog signals output by the respective photoelectric converters 16 and 17, and are input to the switching circuit 201 switchably selects either the image signals SD1 and SD2 based on the selector signal S5 set by the CPU 102, and output the selected signal to the A/D converter 202.

The image signals SD1 and SD2 undergo analog processing for amplitude and waveform adjustment and the like via the A/D converter 202, after which the image signals SD1 and SD1 are converted to 8-bit digital signal image data D for each pixel based on the reference voltage VRef from the CPU 102.

The image data D1 are input to the shading correction section 203, for shading correction based on the correction data set via the CPU 102.

Then, in the color discrimination section 204, the color of each pixel of the image data is determined in accordance with the color mode set via the CPU 102, and 1-bit color data DC are output to indicate whether or not the color is a specified color.

In the variable magnification process section 205, the variable magnification process is electrically executed in accordance with the magnification set via the CPU 102.

Finally, in the image quality correction section 206, gamma correction and like image quality corrections are executed in accordance with the parameters set via the CPU 102. Then, the aforesaid color data DC and the image data D2 are output to the memory unit section 30.

In the continuous duplex mode, the image signals SD2 corresponding to the reverse side are continuously output while the original is transported over the image reader 10b. The image signals SD1 corresponding to the front side are continuously output while the image reader 10a is scanning. In the high speed mode, the image signals SD1 corresponding to the front side are continuously output while the original is transported over the image reader 10a which is stationary at the reverse side reading position RPa.

The image signal process section 20 consecutively receives the image signals SD2 corresponding to the reverse side, consecutively processes said signals, and outputs image data D2 for the reverse side. After the image data process for the reverse side ends, the image signals SD1 corresponding to the front side are consecutively received and processed, and output as image data D2 for the front side.

The memory unit section 30 is described hereinafter.

Figure 17:
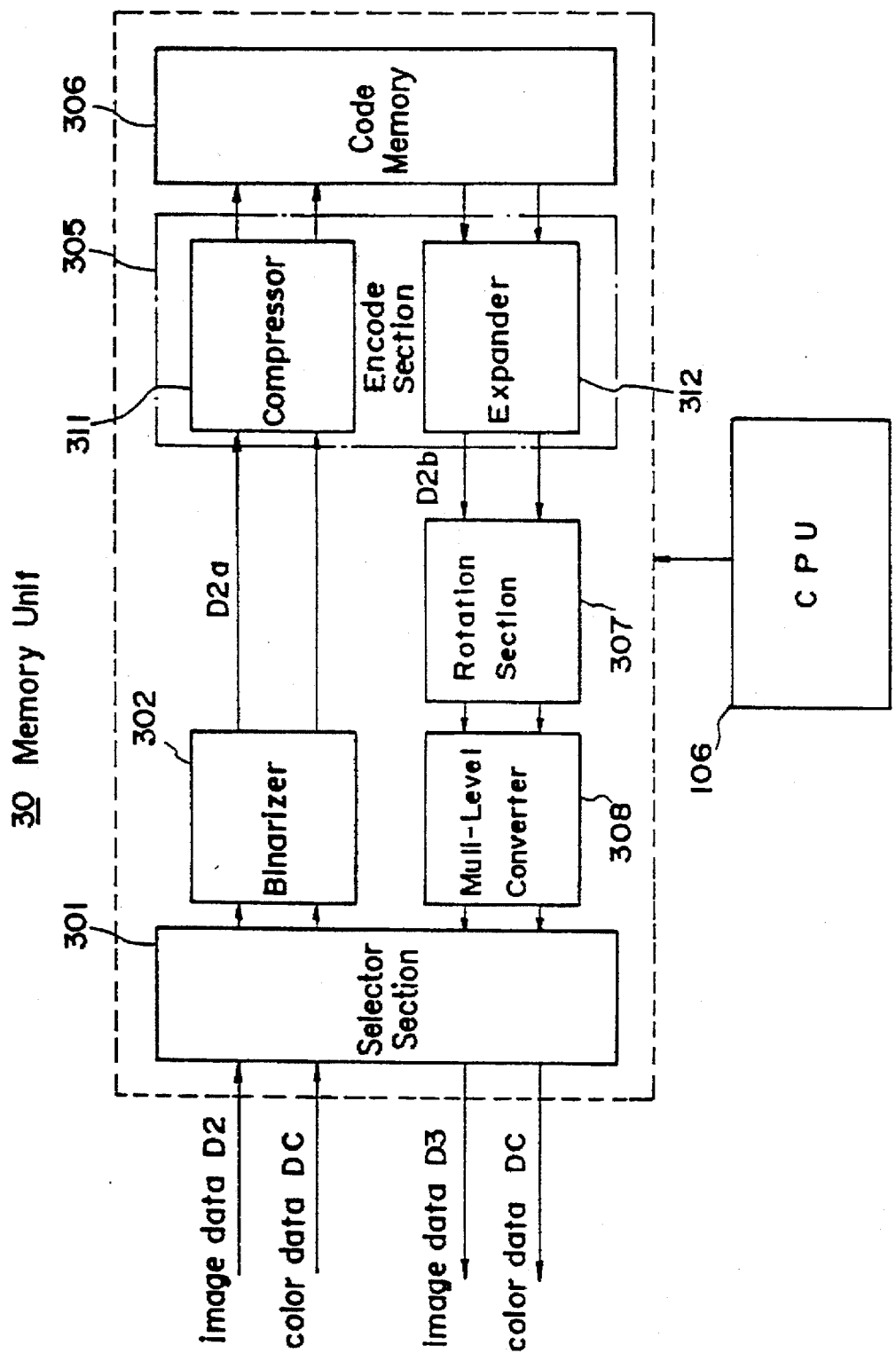

FIG. 17 is a block diagram showing the memory unit 30.

The memory unit 30 comprises a selector section 301, binarizer 302 for creating binary data based on the parameters settings from the CPU 106, encode section 305 provided with individually operable compressor 311 and expander 312, code memory 306 with multiple ports, rotation section 307, multi-level converter 308 for creating multi-level data based on the parameter settings from the CPU 106, and a CPU 106 which executes the general control for the aforesaid components.

The selector section 301 sets the connective states in accordance with the control signals transmitted from the CPU 106 so as to control the flow of image data D and color data DC.

The encode section 305 encodes and compresses the input image data D2a in 1-line segments in real time, and compares the amount of post-compression data with the amount of precompression data, then writes the image data having the lesser volume into the code memory 306. That is, either uncompressed image data or compressed encoded image data are written in 1-line segments to the code memory 306.

The image data or the compressed encoded data written to the code memory 306 are read therefrom via a command from the CPU 106, and when said data are compressed encoded data they are expanded to generate image data D2b.

Thus, in the memory unit 30, each line of the input image data D2 (D2a) is compressed in real time, and the data read from the code memory 306 is expanded in real time, such that the image memory (page memory) used to store 1-page segments of image data D2a before compression and the image memory (page memory) used to store the 1-page segments of image data D2b after expansion are not required. This arrangement allows memory use of improved efficiency and reduces the amount of installed memory.

Furthermore, because the compressed encoded data is not stored automatically in the code memory 306, but rather compared first with the amount of uncompressed image data such that the image data of the lesser amount is stored in the code memory 306, thereby improving memory use efficiency of the code memory 306. Since the compression and expansion of the image data are accomplished in real time, these processes do not require additional processing time, thereby improving data processing efficiency.

In the compressor 311 and the expander 312, the amount of transmitted code data is always less than the amount of image data D2a for identical lines, such that the capability of transferring the amount of image data D2a is desirable. High speed processing can be accomplished without using conventional image memory by conforming the reading speed of the image reader IR2 and the system speed of the printer PRT with the image data D2a transfer capability.

Although the aforesaid compressor 311 and expander 312 have been described as being provided with a single compressor and a single expander, they alternatively may be provided with a plurality of types of compressors and expanders.

The general operation sequence of the copying apparatus 1000 in the memory mode writing operation is described hereinafter, said discussion centering around the request commands (Q), reports (A), and data from among the CPUs 101 through 106. Inconsequential request commands and reports are omitted from the following discussion and drawings.

Figure 18:
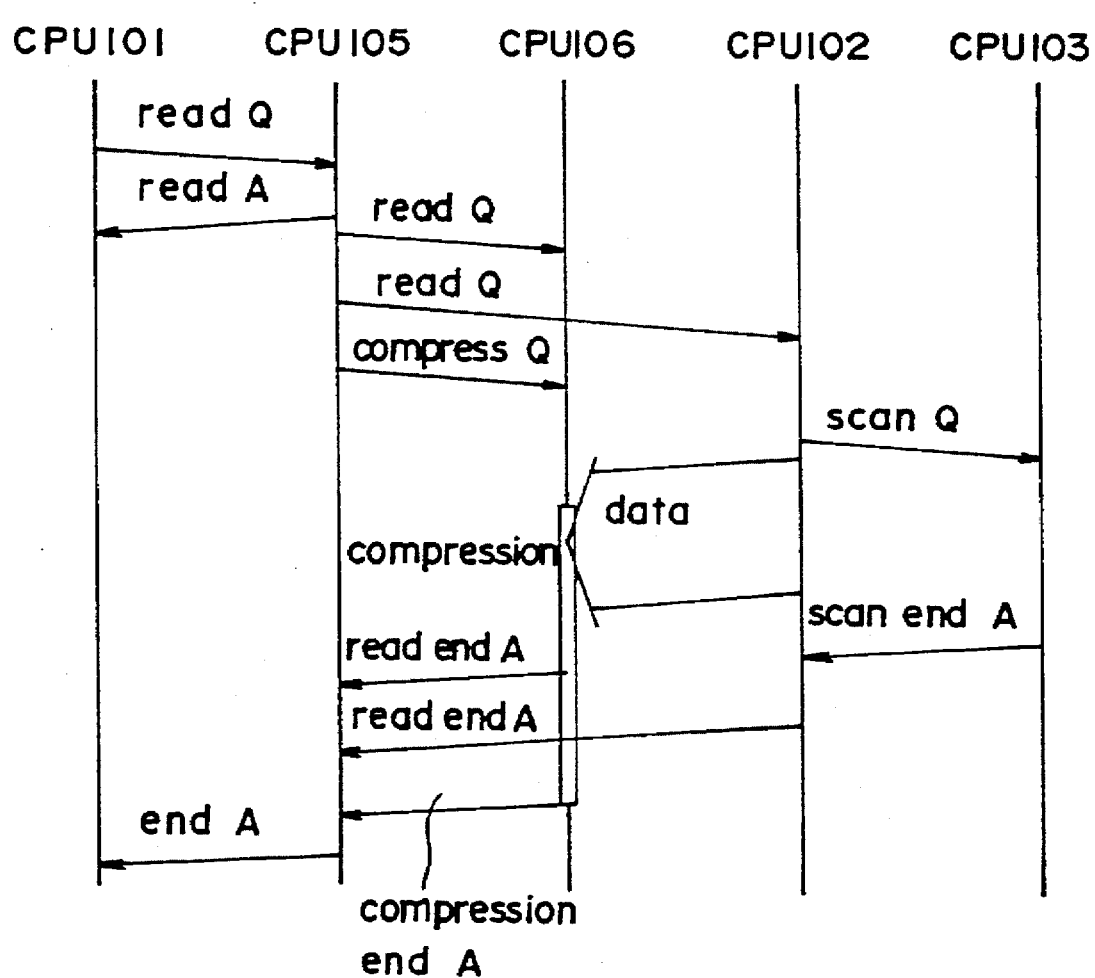

FIG. 18 is an illustration showing the sequence of the memory mode writing operation.

In the memory mode writing operation, the image data read by the image reader IR2 are transferred to the code memory 306 in the manner previously described.

When the start key 96 is depressed on the operation panel OP and a read request is output from the CPU 101 to the CPU 105 which processes the entire sequence, the CPU 105 returns a read report to the CPU 101.

The CPU 105 transmits the read request and compression request to the CPU 106, the read request is output to the CPU 102, and a scan request is output from the CPU 102 to the CPU 103. Thus, the CPU 106 executes various setting for the internal hardware, e.g., settings for the connective state of the selector section 301 to transfer the image data D2 from the image signal process section 20 to the code memory 306, mode settings for the binarization process (e.g., threshold values for error distribution and background elimination, binarization threshold and the like), mode settings for the compressor 333 (e.g., modified Huffman coding (MH) method), and settings for the number of data and write addresses to the code memory 306. Then, scanning starts.

When the scan reaches the image region of the original, the read data (image data D2) are output to the memory unit 30 in accordance with the image processing mode set by the CPU 102.

In the memory unit 30, each 1-line segment of the input read data is compressed in real time. The encoded data or the image data are the sequentially stored in the code memory 306.

When the scan reading and compression process end, a read end report and compression end report are transmitted from the CPU 106 to the CPU 105, and a compression end report is output from the CPU 102.

The operation of the copying apparatus 1000 is described hereinafter with reference to the flow charts.

Figure 19:
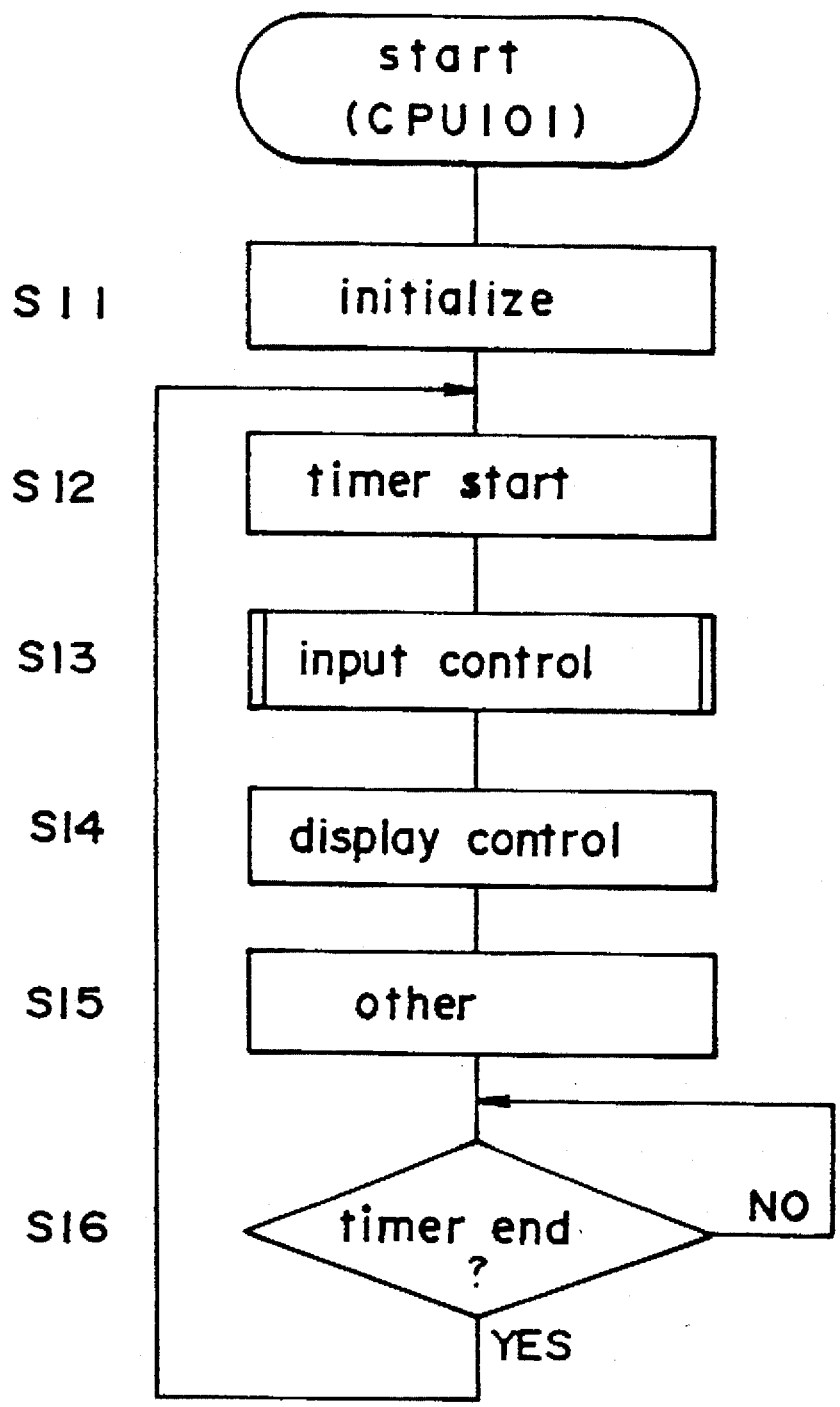

FIG. 19 is a flow chart showing the main routine of the CPU 101.

After initialization (step S11), the internal timers are started and monitored to unify the time of one routine (steps S12, S16), input control processes and display control processes are executed for the operation panel OP and the like (steps S13 and S14), and other processing is executed (step S15). Communication are executed with the other CPUs 102 through 106 via interrupt processes.

Figure 20:
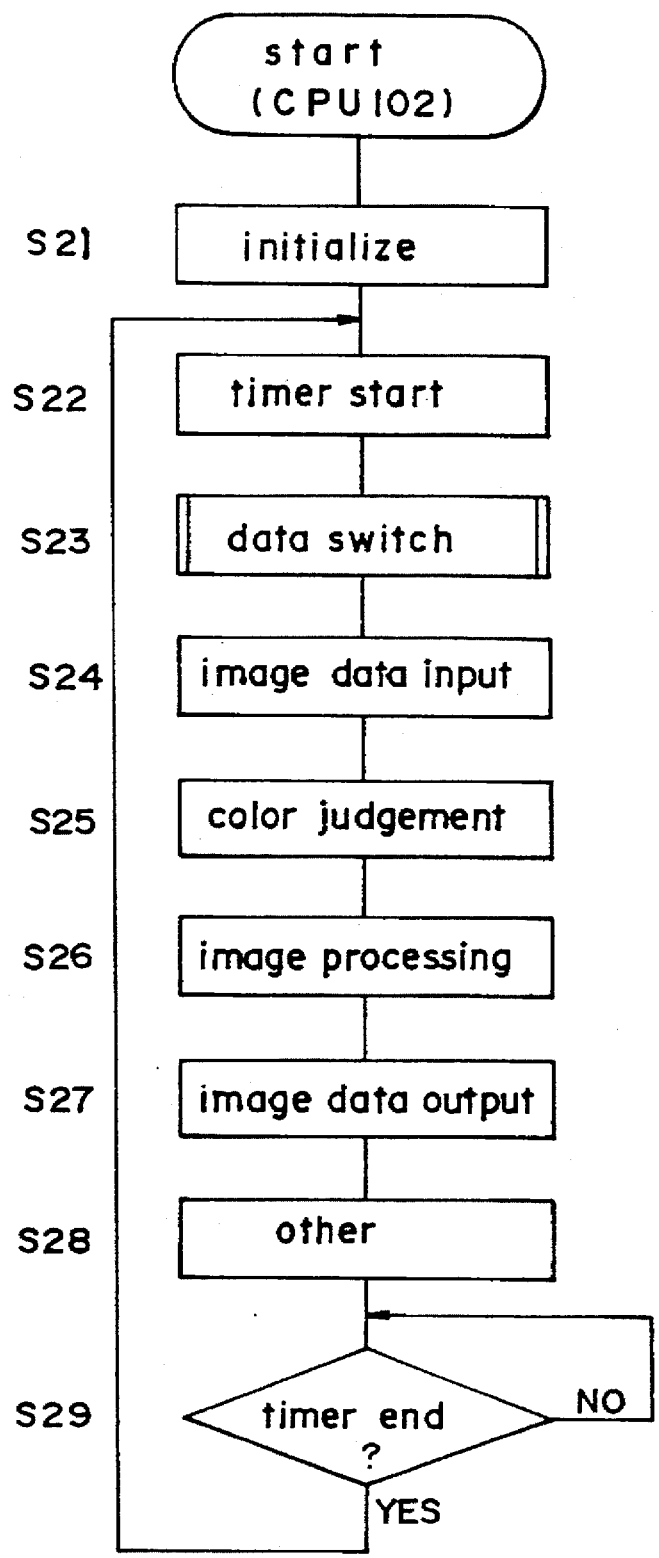

FIG. 20 is a flow chart showing the main routine of the CPU 102.

This routine executes the data input switch process for switching the image signals SD1 and SD2 output from the photoelectric converters 16 and 17 (step S23), image data input process (step S24), and thereafter the color discrimination process, image process, image data output process, and other processing are executed (steps S25 through S28).

Figure 21A:
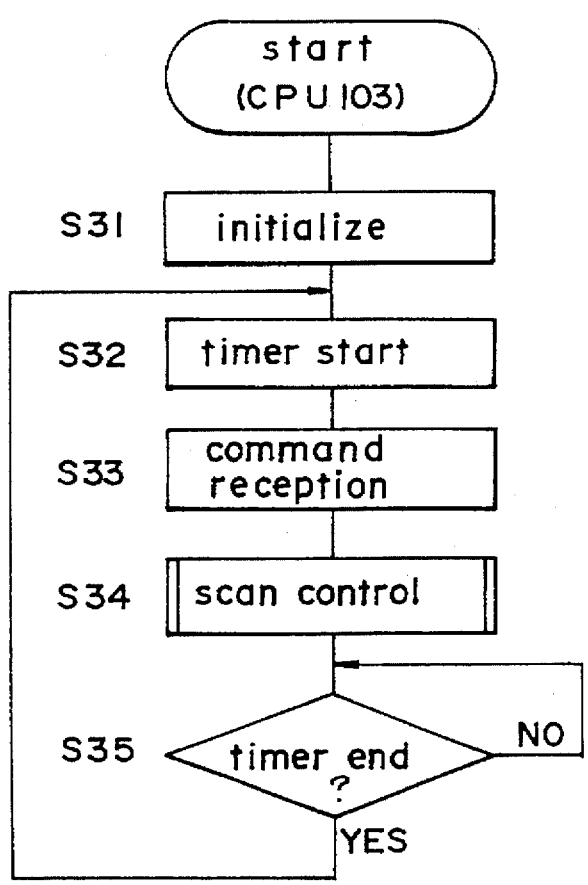
FIG. 21(a) and FIG. 21(b) is a flow chart showing the main routine of the CPU 103.
Figure 21B:
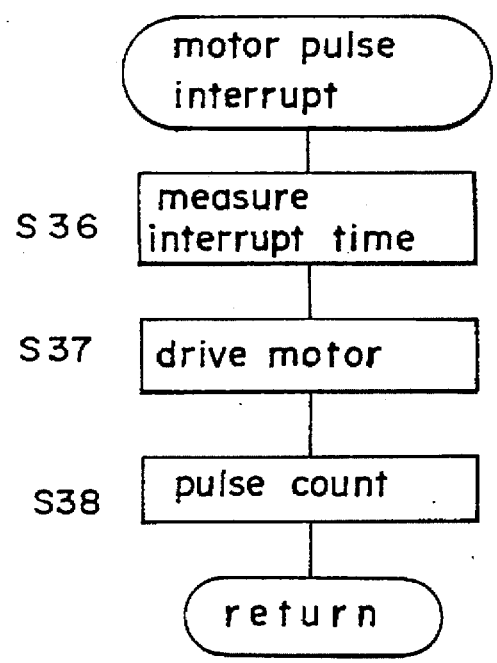

FIG. 21 is a flow chart showing the main routine of the CPU 103.

The CPU 103 controls the scanning unit 10. The following description assumes only a duplex original document.

The command reception process is executed (step S33), and scan controls are then executed in accordance with the aforesaid command (step S34).

When motor pulse interrupts are generated via the motor pulses produced synchronously with the rotation of the scan motor M2, the intervals of said motor pulse interrupts are measured (step S36), and ON/OFF switching of the power to the motor (step S37), motor pulse count (step S38) and the like are accomplished. The rotational control of the scan motor M2 is thus accomplished.

Figure 22:
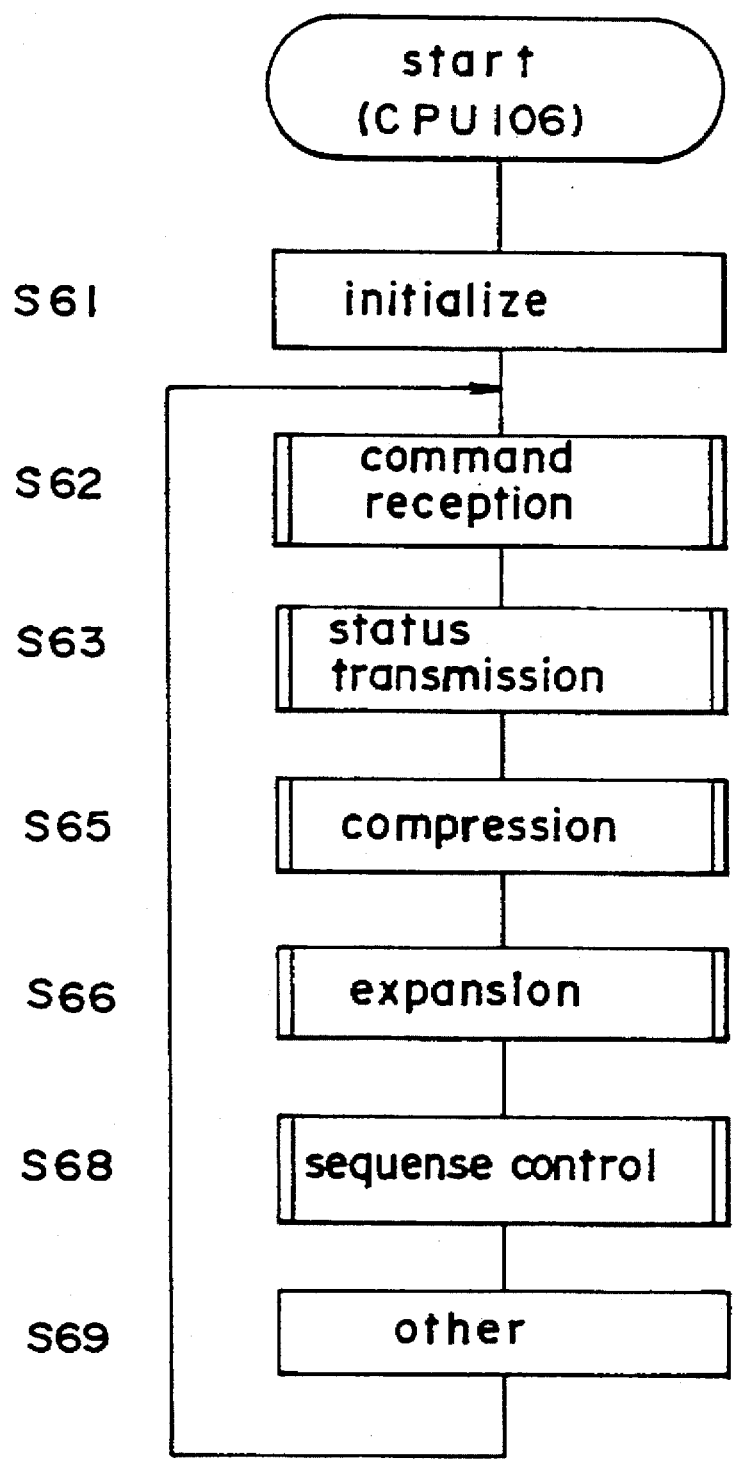

FIG. 22 is a flow chart showing the main routine of the CPU 106.

The CPU 106 controls the memory unit 30. Command reception processing for commands from the other CPU is executed (step S62), status transmission process is executed (step S63), compression control is executed (step S65), expansion control is executed (step S66), and sequence control is executed (step S68).

Figure 23:
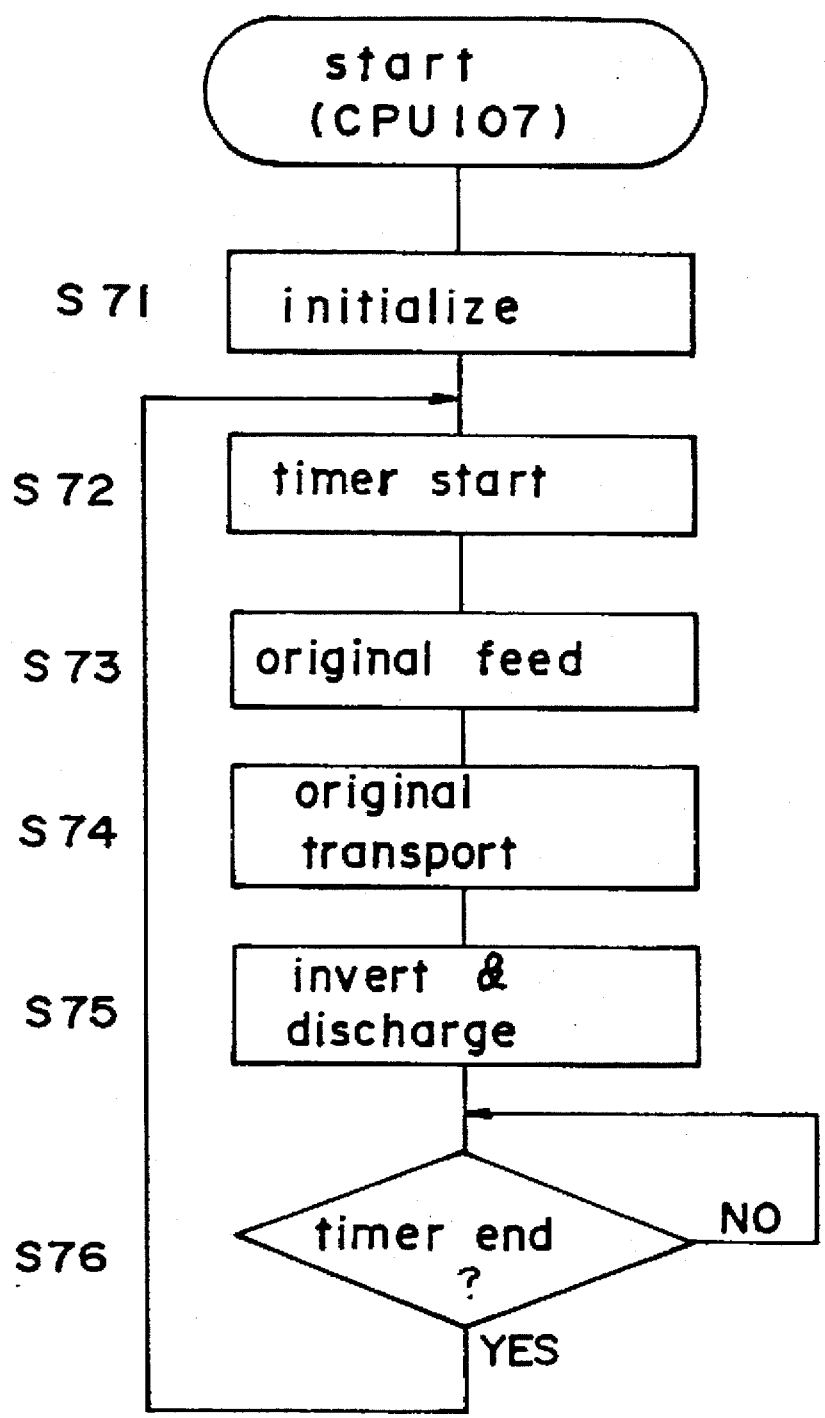

FIG. 23 is a flow chart showing the main routine of the CPU 107.

The CPU 107 controls the document feeding portion 500a. The original feed process is executed to feed the originals, correct their inclination and control their transport to the transport belt 506 (step S73), the original transport process is executed to position the original at at predetermined reading position via the transport belt 506 and control the transport of said original to the inverting roller 507 (step S74), and the invert and discharge process is executed to discharge the original at the inverting roller 507 as is, or refeed the original to the transport belt 506 (step S75).

Figure 24:
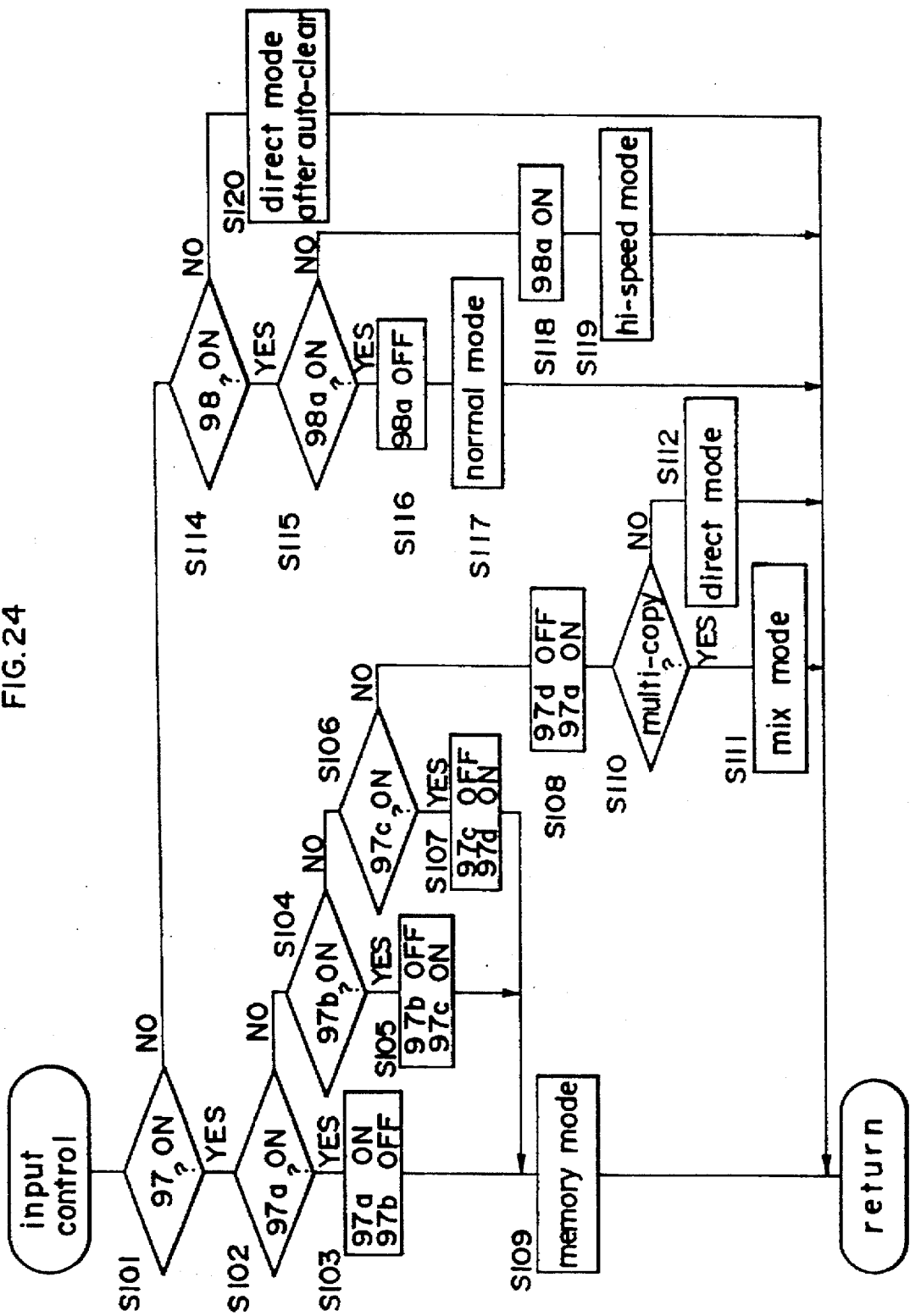

FIG. 24 is a flow chart showing the input control process of step S13.

Whenever the ON state of the mode setting key 97 is detected (step S101: YES), a circulating type copy mode selection is available in the sequence: [single side-single side], [duplex-single side], [single side-duplex], [duplex-duplex]. The displays 97a through 97d indicating the aforesaid copy mode selections are sequentially lighted (steps S102 through S108).

When a copy mode other than the [single side-single side] is selected (steps S103, S105, S107), the memory mode is set (step S109). When the [single side-single side] copy mode is set (step S108) and the multicopy mode is set (step S110: YES), the direct and memory (mix) mode is set (step S111), whereas if the [single side-single side] copy mode is set (step S108) and the single copy mode is set (step S110: NO), the direct mode is set (step S112).

When the ON state of the high-speed mode key 98 is not detected (step S114: NO), the high speed mode and the normal mode are switched (steps S115, S117), and the high-speed mode display 98a is either lighted or extinguished in accordance with the set mode.

When the ON states of the mode set keys 97 or 98 are not detected (step S114: NO), the auto clear is executed and the direct mode is set (step S120).

Figure 25:
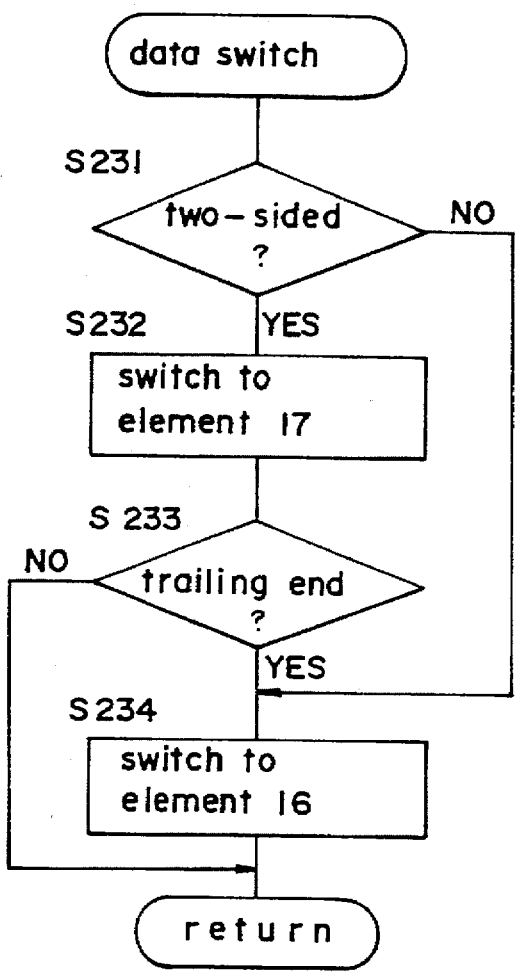

FIG. 25 is a flow chart showing the data switch process of step S23.

In this process, the image data SD1 and SD2 output to the A/D converter via the switching circuit 201 are switched.

First, a check is made to determine whether or not the read original is a duplex original via the data set through the operation panel OP (step S231). In the case of a duplex original, the switching circuit 201 is switched to the photoelectric converter 17 of the image reader 20b, the image signals SD2 are output (step S232), and after the trailing edge of the original is detected the circuit is switched to the photoelectric converter 16 of the image reader 10a, and the image signals SD1 are output (step S234).

In the case of nonduplex originals, the switching circuit 201 is switched to the photoelectric converter 16 and the image signals SD1 are output (step S234).

Figure 26:
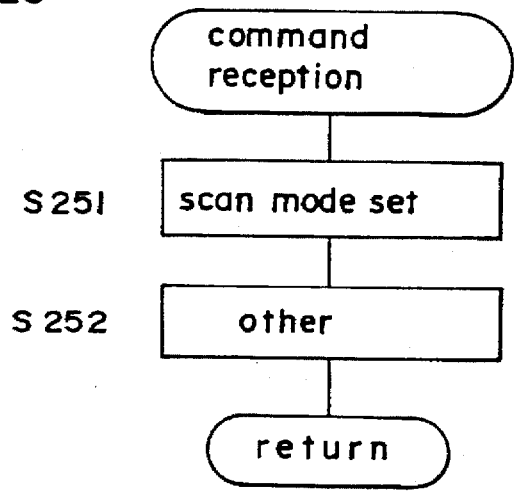

FIG. 26 is a flow chart showing the command reception process of step S33.

In the command reception process, commands received from the CPU 102 set the scan mode for continuous reading of duplex originals or reading by scanner scanning (step S251). The commands received from the CPU 102 are set via the operation panel OP. When the high-speed mode set key 98 is depressed to set the high-speed mode, the reading mode may be both front side and reverse side continuous image reading modes, whereas when the normal mode is set, either one or the other of said reading modes is set. Various modes are set by various other commands (step S252).

Figure 27:
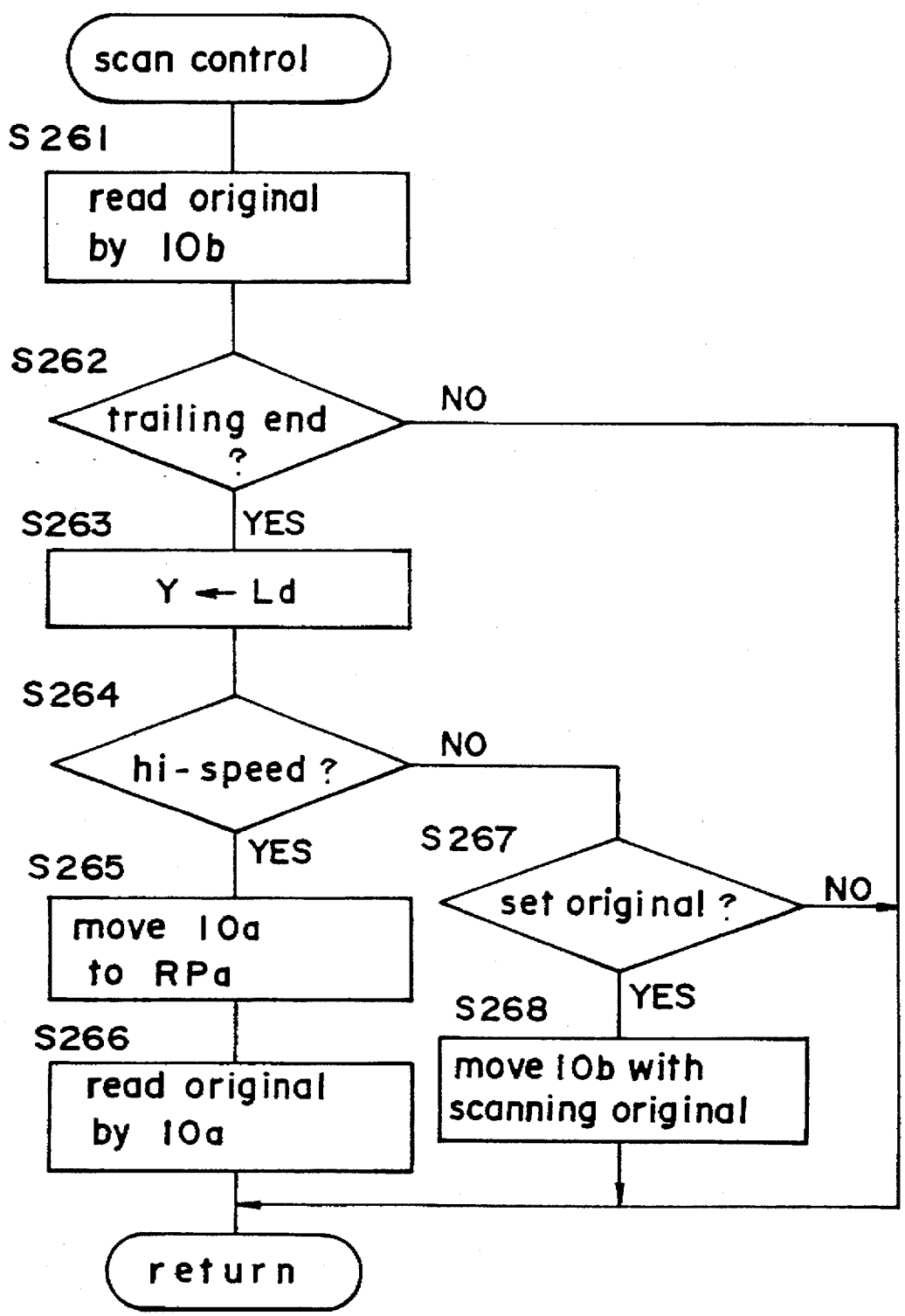

FIG. 27 is a flow chart showing the scan control process of step S34. This control process is described only in the case of the duplex original reading modes.

In the scan control, first the reverse side of the originals are continuously read via the photoelectric converter 17 of the image reader 10b (step S261). The reverse side of the original is read as the original is being transported, and when the trailing edge of the original is detected by the photoelectric converter 17 (step S262: YES), the length Ld of the detected original is set in memory Y (step S263).

A check is made in step S264 to determine whether or not the high-speed mode is selected. If the high-speed mode is selected, the scan motor M2 is actuated to move the image reader 10a to the image reading position RPa a distance Y from the home position (step S265) to execute continuous reading by the image reader 10a, and the image of the fed original is read by the photoelectric converter 16 (step S266).

When the normal mode is selected (step S264: NO), the original is set at a predetermined position on the platen glass 18 (step S267), the image reader 10b is driven via the scan motor M2 so as to scan a scan length Y to read the image of the front surface of the original (step S268).

Figure 28:
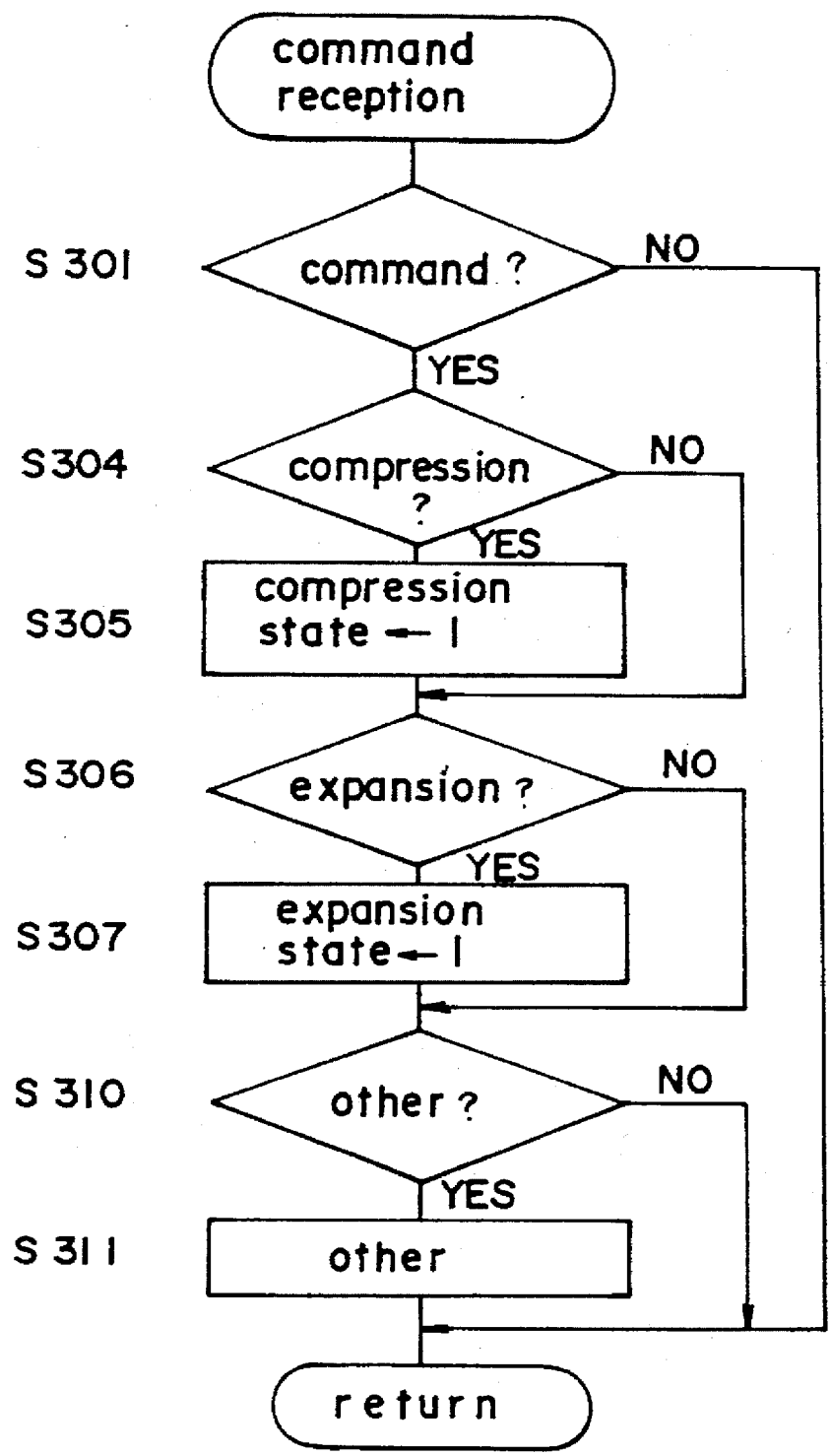

FIG. 28 is a flow chart showing the command reception process of step S62.

When a command is received (step S301: YES), the compression state is set at [1] if said command is a compression command (steps S304, S305), whereas the expansion state is set at [1] if said command is an expand command (steps S306, S307).

Figure 29:
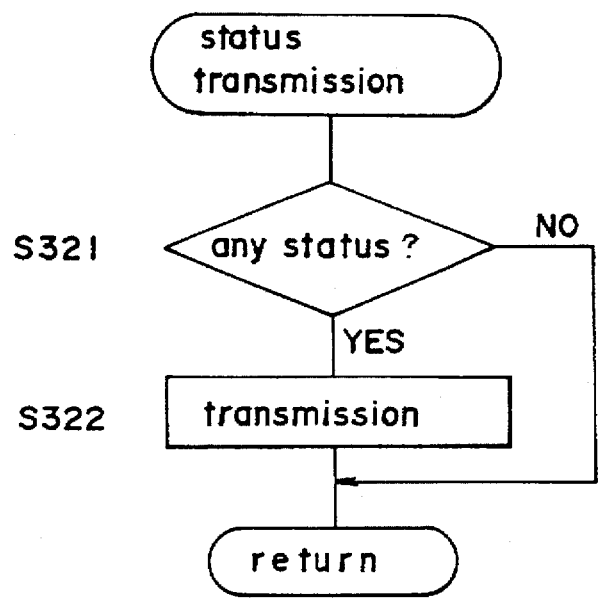

FIG. 29 is a flow chart showing the status transmission process of step S63.

When a status report is generated it is transmitted (steps S321, S322).

Figure 30:
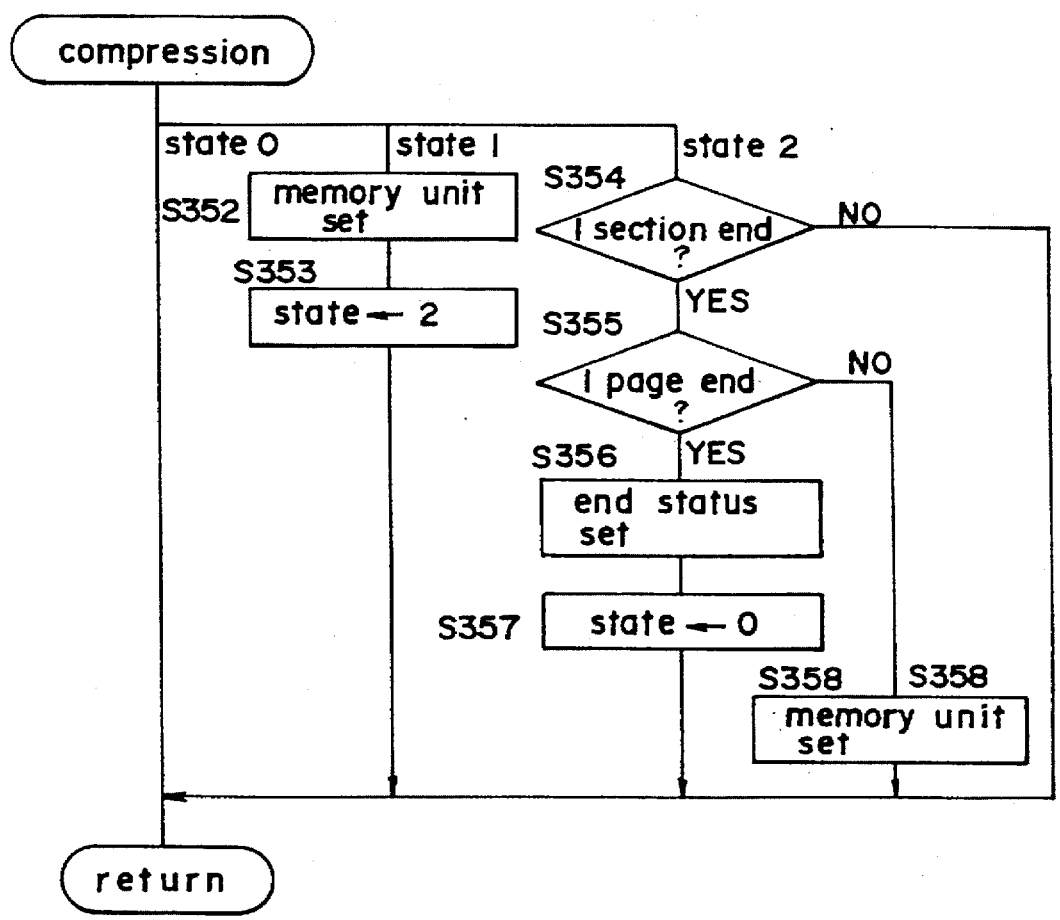

FIG. 30 is a flow chart showing the compression control process of step S65.

In state [1], settings are executed for the compression process, i.e., compression methods, XY links data, write addresses to the code memory 306 and the like, and the contents of the management table MT1 for the aforesaid data is modified (step S352), and the state is set at [2] (step S353).

In state [2], one memory areas divided into 32 kilobyte segments is set for the aforesaid data each time the compression process ends (step S358). When a one-page compression process ends, the compression end status os set (step S356), and the state is set at [0] (step S357).

Figure 31:
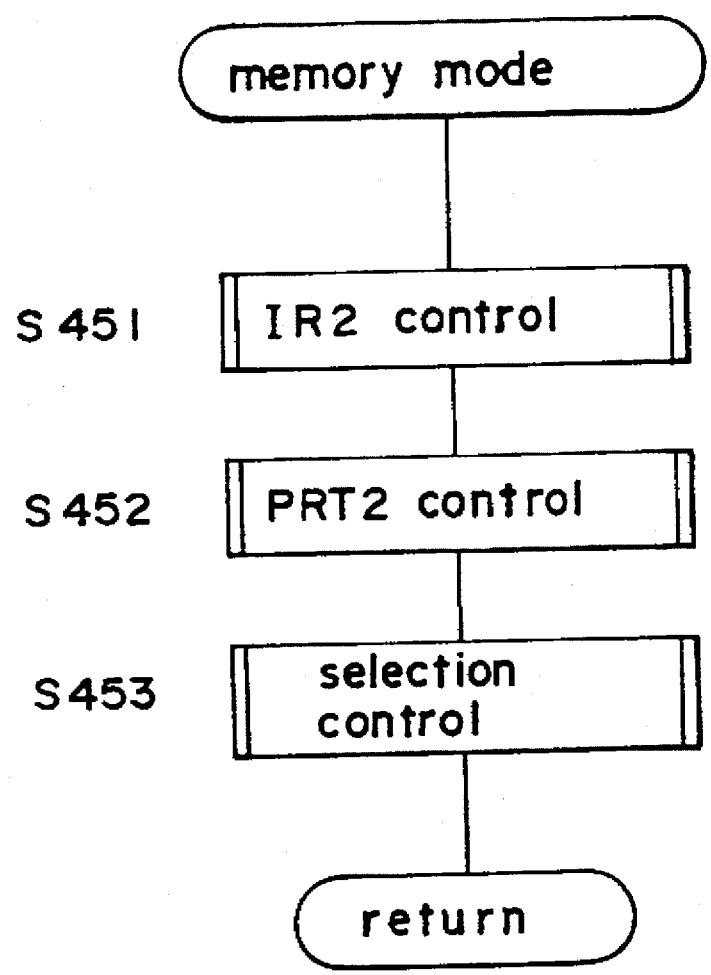

FIG. 31 is a flow chart showing the memory mode process executed during the sequence control process of step S68.

The IR2 control is executed to control the image reader IR2 (step S451), the PRT2 control is executed to control the printer PRT2 (step S452), and the selection control is executed (step S453).

Figure 32A:
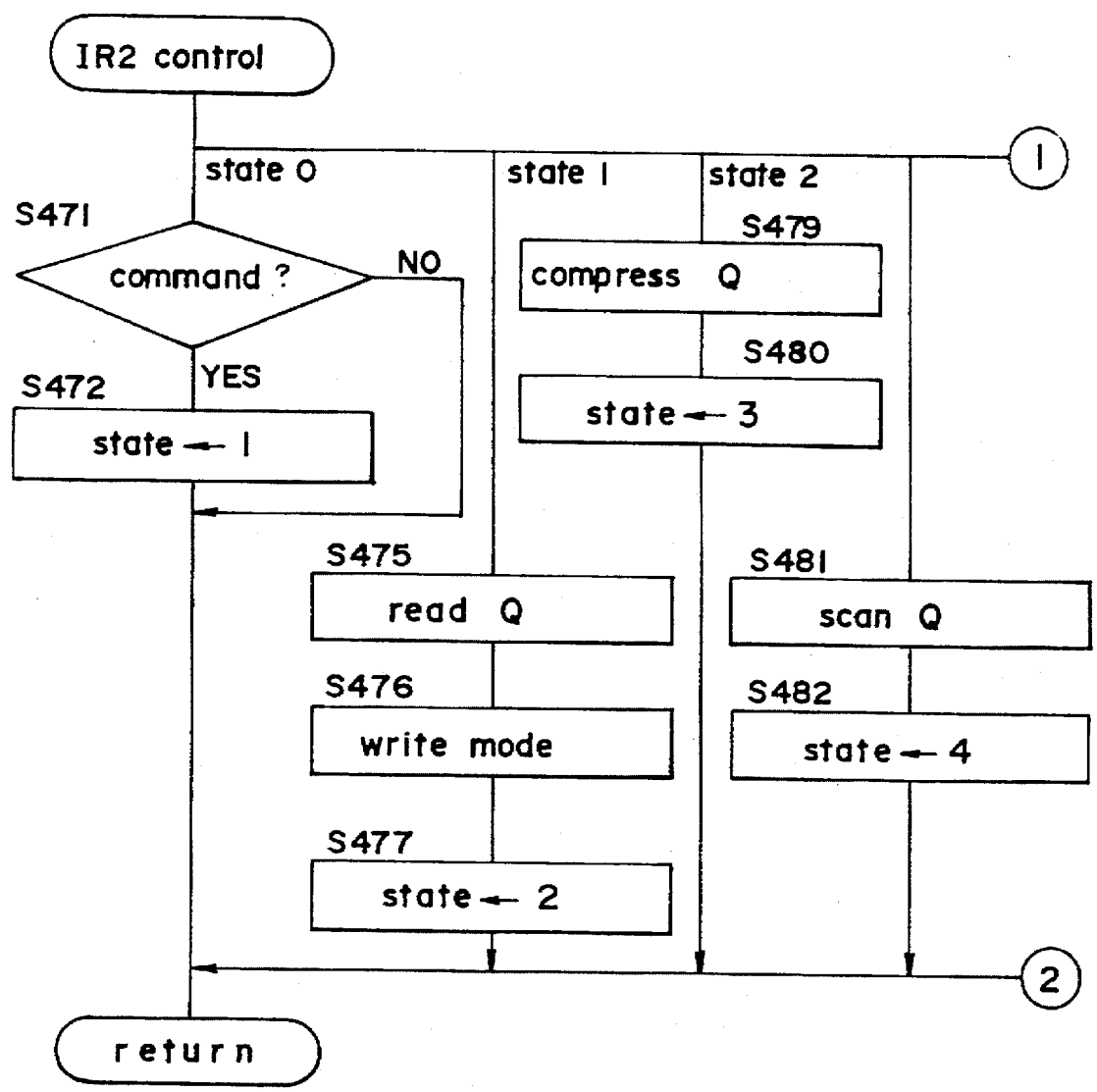
FIGS. 32a and 32b are a flow chart showing the IR control process.
Figure 32B:
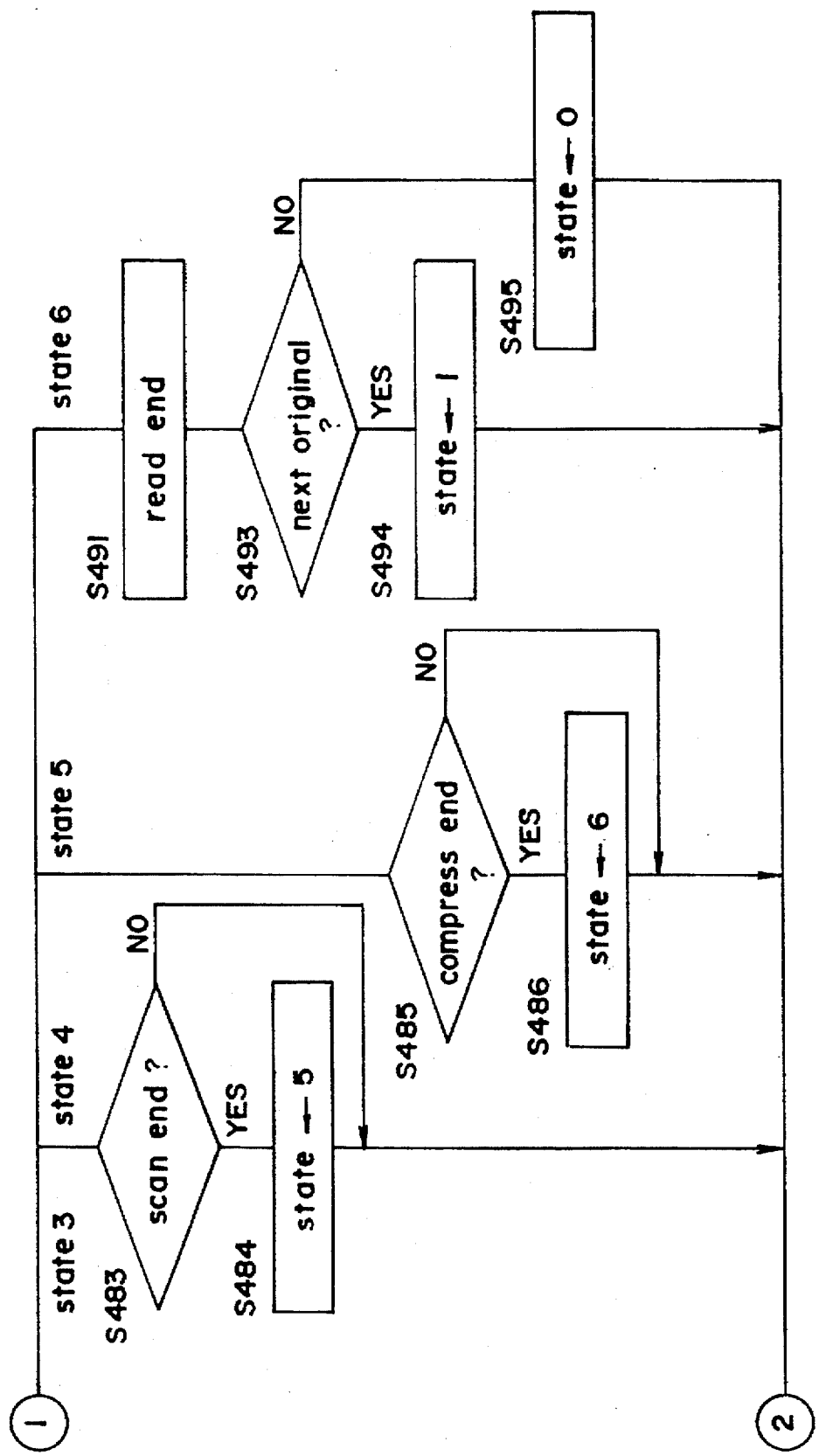

FIG. 32 is a flow chart showing the IR control process of step S451.

In state [0], when a command is received by the code memory 306 from the image reader IR2, the state is set at [1] (steps S471, S472).

In state [1], a read request is output (step S475), the connective state of the selector section 301 is set so allow the memory a write mode operation (step S476), and the state is set at [2] (step S477).

In state [2], a compression request is output, and the state is set at [3] (steps S479, S480).

In state [3], a scanner scan request is output, and the state is set at [4] (steps S481, S482).

In state [5], if compression has ended, the state is set at [6] (steps S485, S486).

In state [6], the scanner reading ends, task N is generated (steps S491, S492), and when a next original is present, the state is set at [1] (steps S493, S494), whereas when a next original is absent, the state is set at [0] (step S495).

Figure 33:
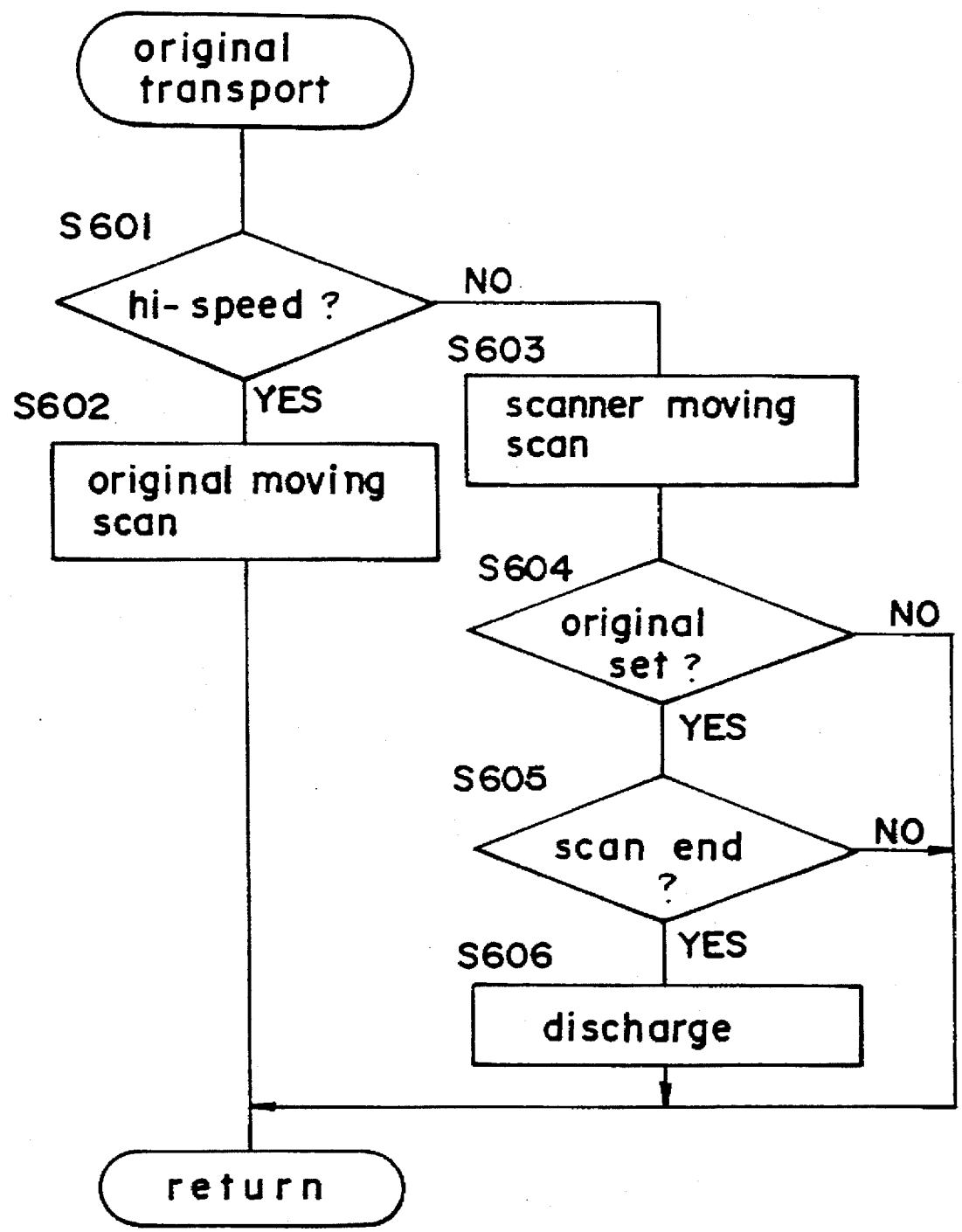

FIG. 33 is a flow chart showing the original transport process of step S74.

When the image reading mode is the high-speed mode, i.e., when the duplex continuous reading mode is set (step S601: YES), the original is not stopped on the top of the platen glass 18, but rather is transported at uniform speed over the image reader 10a via the transport belt 506 (step S602). The aforesaid uniform speed is a constant speed conforming with the image data D2a transfer capability.

When the image reading mode is the normal mode, i.e., when the scanner scanning mode is set (step S601: NO), the original is fed so as to be set at a predetermined position on the platen glass 18 (step S603). When the original has been set (step S604: YES), the image reader 10a is actuated and the front surface of the original is read via scanning by the image reader 10a.

When the image reading of the image reader 10a is completed (step S605: YES), the transport belt 506 is forward rotated, and the original is transported to the inverting roller 507 (step S606).

Although, a photoelectric converter 17 in the image reader 10b was used as the detection means for detecting the length of the original in the described embodiments, it is to be noted that a special sensor may be provided for said purpose. Furthermore, a plurality of sensors may be used to detect the presence of originals stacked on the document tray 511 so as to detect the size of said originals via combinations of the detection signals of said plurality of sensors, thereby allowing the length of the original to be determined from the size of said originals. Still further, the length of the original or the size of the original may be input from the operation panel OP.

The circuit construction of the control portion 100, contents of the processes of the CPUs 101 through 108, process apportionment, and software construction, as well as the construction of the various components of the copying apparatus 1 may be variously modified insofar as such modifications do not depart from the scope of the invention.

Although the present invention has been described with the preferred embodiment thereof, it is to be noted that various changes and modifications are apparent to those skilled in the art. Such changes and modifications are to be understood as included within the scope of the present invention as defined by the appended claims, unless they depart therefrom.

What is claimed is:

1. An image reading apparatus comprising:
   an exposure platen;
   feeding means for feeding and setting an original to the exposure platen; and
   reading means for reading an image of the original, said reading means reading a first side of the original while said original is being fed to the exposure platen and reading a second side of the original after said original has been set on the exposure platen.

2. The image forming apparatus as claimed in claim 1, wherein said reading means includes:
   a first reading device which is fixed at a predetermined position and reads an image of the first side of the original while the original is being fed; and a second reading device which is movable along the exposure platen and reads an image of the second side of the original after the original has been set on the exposure platen.

3. The image reading apparatus as claimed in claim 1 wherein:
   said image reading means output a first image signal corresponding to the image of the first side of the original continuously while the image of the first side of the original is being read by the image reading means;
   said image reading means output a second image signal corresponding to the image of the second side of the original continuously while the image of the second side of the original is being read by the image reading means; and
   said image reading means output the second image signal after said image reading means has completed outputting the first image signal.

4. The image reading apparatus as claimed in claim 3, further comprising:
   single image processing means for continuously receiving and processing the first image signal and generating a third image signal and for continuously receiving and processing the second image signal and generating a fourth image signal after processing the third image signal.

5. The image reading apparatus as claimed in claim 4, further comprising:
   image forming means for forming an image on a copy sheet corresponding to the image of the first side of the original in response to the third image signal and for forming an image on a copy sheet corresponding to the image of the second side of the original in response to the fourth image signal.

6. In a duplex original image reading apparatus including a first image reading device for reading an image of a first side of an original and a second image reading device for reading an image of a second side of the original, the method comprising the steps of:
   feeding an original to an exposure platen;
   reading, by the first image reading device, the image of the first side of the original while the original is being fed to the exposure platen;
   setting and keeping the original stationary at a predetermined position on the exposure platen; and
   reading, by the second image reading device, the image of the second side of the original which has been set and kept stationary on the exposure platen.

7. An image reading apparatus comprising: an exposure platen;

feeding means for feeding and setting an original to the exposure platen;

first reading means provided at a first reading position for reading an image of a first side of the original being fed by said feeding means; and second reading means including a movable element which is movable along the exposure platen, said second reading means being operable in a first mode and second mode, said second reading means reading the image of the second side of the original by keeping the movable element stationary at a second exposure position in the first mode, and said second reading means reading the image of the second side of the original by moving the movable element along the exposure platen in the second mode.

8. The image reading apparatus as claimed in claim 7, further comprising means for changing the second position in accordance with a size of the original in a feeding direction.

* * * * *